United States Patent
Flynn et al.

(10) Patent No.: US 11,323,055 B2
(45) Date of Patent: May 3, 2022

(54) DIVIDED PHASE AC SYNCHRONOUS MOTOR CONTROLLER

(71) Applicant: QM Power, Inc., Kansas City, MO (US)

(72) Inventors: Charles J. Flynn, Greenwood, MO (US); Cooper N. Tracy, Belton, MO (US)

(73) Assignee: QM Power, Inc., Kansas City, MO (US)

( * ) Notice: Subject to any disclaimer, the term of this patent is extended or adjusted under 35 U.S.C. 154(b) by 0 days.

(21) Appl. No.: 17/020,444

(22) Filed: Sep. 14, 2020

(65) Prior Publication Data

US 2020/0412287 A1 Dec. 31, 2020

Related U.S. Application Data

(63) Continuation of application No. 16/436,844, filed on Jun. 10, 2019, now Pat. No. 10,778,132, which is a
(Continued)

(51) Int. Cl.
| | |
|---|---|
| *H02P 23/00* | (2016.01) |
| *H02P 25/024* | (2016.01) |
| *H02P 25/022* | (2016.01) |

(52) U.S. Cl.
CPC ............ *H02P 23/00* (2013.01); *H02P 25/022* (2013.01); *H02P 25/024* (2016.02)

(58) Field of Classification Search
CPC ...... H02P 1/00; H02P 1/04; H02P 1/12; H02P 1/16; H02P 1/163; H02P 1/24; H02P 1/26; H02P 1/28; H02P 1/30; H02P 1/265; H02P 1/42; H02P 1/423; H02P 1/46; H02P 1/465; H02P 3/00; H02P 3/2013; H02P 3/01; H02P 3/24; H02P 3/08; H02P 4/00; H02P 4/2013; H02P 4/01; H02P 5/00; H02P 5/2013; H02P 5/01; H02P 6/00; H02P 6/2013; H02P 6/01; H02P 6/04;
(Continued)

(56) References Cited

U.S. PATENT DOCUMENTS

| | | | |
|---|---|---|---|
| 4,039,913 A * | 8/1977 | Clegg | H02P 25/14 318/245 |
| 5,710,493 A | 1/1998 | Flynn | |

(Continued)

*Primary Examiner* — Antony M Paul
(74) *Attorney, Agent, or Firm* — Polsinelli PC

(57) ABSTRACT

A method is for a circuit for a motor comprising first and second phase windings. The method comprises receiving alternating current (AC) power from the first and second phase windings at a direct current (DC) power supply and converting the AC power to DC power and receiving AC power from the first and second phase windings by at least one power switch between the first and second phase windings and switching the AC power by the at least one power switch. The method includes preventing the DC power supply from collapsing, by a first component connected to the DC power supply, when the at least one power switch is on during a first portion of an AC cycle and preventing the DC power supply from collapsing, by a second component connected to the DC power supply, when the at least one power switch is on during a second portion of the AC cycle.

28 Claims, 15 Drawing Sheets

Related U.S. Application Data continuation of application No. 15/894,848, filed on Feb. 12, 2018, now Pat. No. 10,320,318, which is a continuation of application No. 15/010,874, filed on Jan. 29, 2016, now Pat. No. 9,893,667, which is a continuation of application No. 14/080,785, filed on Nov. 14, 2013, now Pat. No. 9,300,237.

(60) Provisional application No. 61/726,550, filed on Nov. 14, 2012.

(58) Field of Classification Search
CPC .. H02P 6/28; H02P 7/00; H02P 7/2013; H02P 7/01; H02P 7/05; H02P 7/292; H02P 9/00; H02P 9/2013; H02P 9/01; H02P 11/00; H02P 13/00; H02P 21/00; H02P 21/22; H02P 23/00; H02P 23/07; H02P 23/28; H02P 25/062; H02P 25/092; H02P 27/00; H02P 27/04; H02P 27/06; H02P 27/08

See application file for complete search history.

(56) References Cited

U.S. PATENT DOCUMENTS

| | | |
|---|---|---|
| 9,300,237 B2 | 3/2016 | Flynn et al. |
| 9,705,441 B2 | 7/2017 | Flynn et al. |
| 9,893,667 B2 | 2/2018 | Flynn et al. |

* cited by examiner

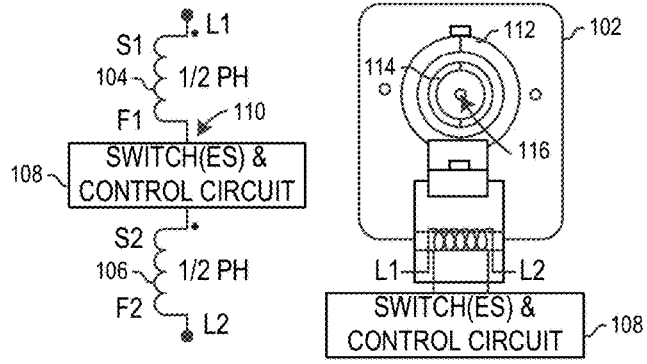
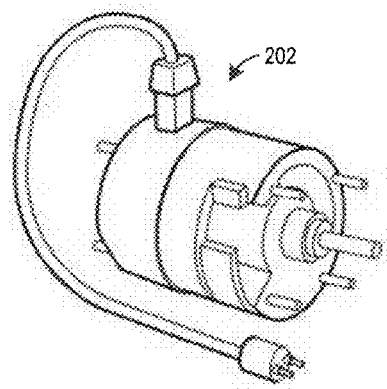
FIG. 1
FIG. 2
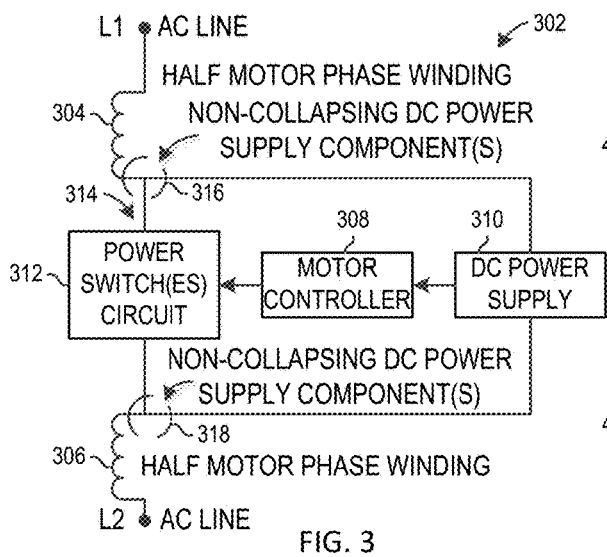
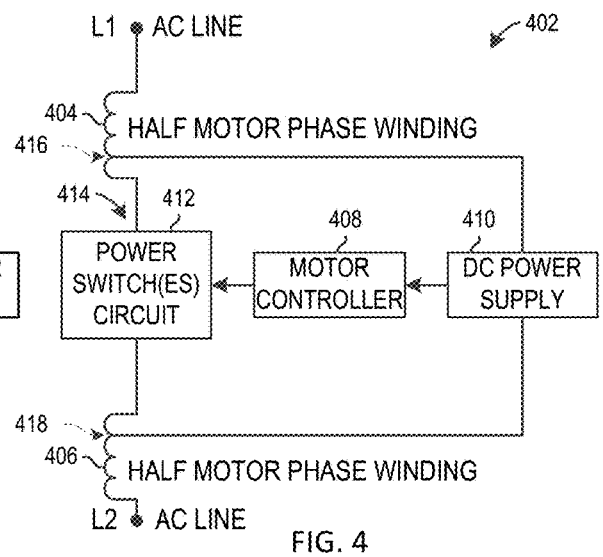
FIG. 3
FIG. 4
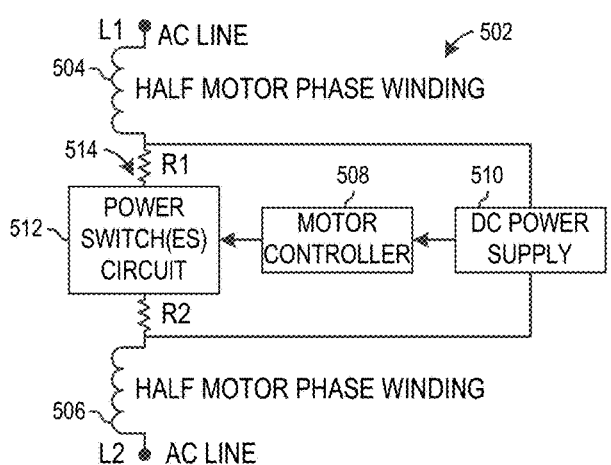
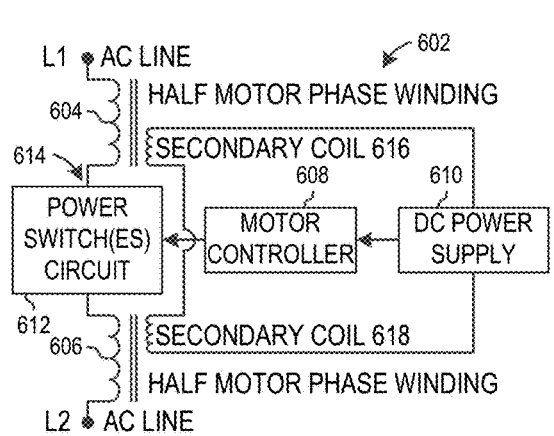
FIG. 5
FIG. 6

US 11,323,055 B2

DIVIDED PHASE AC SYNCHRONOUS MOTOR CONTROLLER

RELATED APPLICATIONS

This application is a continuation of U.S. patent application Ser. No. 16/436,844, entitled Divided Phase AC Synchronous Motor Controller, filed Jun. 10, 2019, which is a continuation of U.S. patent application Ser. No. 15/894,848, entitled Divided Phase AC Synchronous Motor Controller, filed Feb. 12, 2018, now U.S. Pat. No. 10,320,318, which is a continuation of U.S. patent application Ser. No. 15/010,874, entitled Divided Phase AC Synchronous Motor Controller, filed Jan. 29, 2016, now U.S. Pat. No. 9,893,667, which is a continuation of U.S. patent application Ser. No. 14/080,785, filed Nov. 14, 2013, now U.S. Pat. No. 9,300,237, entitled Divided Phase AC Synchronous Motor Controller, which claims priority to U.S. Patent App. Ser. No. 61/726,550, entitled Divided Phase AC Synchronous Motor Controller, filed Nov. 14, 2012, the entire contents of which are incorporated herein by reference. This application is related to U.S. patent application Ser. No. 14/991,683, now U.S. Pat. No. 9,712,097, entitled Divided Phase AC Synchronous Motor Controller, filed Jan. 8, 2016, U.S. patent application Ser. No. 15/010,836, now U.S. Pat. No. 9,787,239, entitled Divided Phase AC Synchronous Motor Controller, filed Jan. 29, 2016, and U.S. patent application Ser. No. 15/010,867, now U.S. Pat. No. 9,705,441, entitled Divided Phase AC Synchronous Motor Controller, filed Jan. 29, 2016, the entire contents of which are incorporated herein by reference.

FEDERALLY SPONSORED RESEARCH OR DEVELOPMENT

Not Applicable.

COMPACT DISK APPENDIX

Not Applicable.

BACKGROUND

In view of the growing proliferation of environmentally friendly laws, enhancements to various classes of motors are required. For example, refrigeration fan motors in a low wattage range, e.g. 4 to 16 watts, used in both the commercial and residential refrigeration markets, have traditionally been low efficiency, such as around 12%-26% efficient. It would be desirable to provide technologies to address enhancements required in different classes of motors.

SUMMARY

In one aspect, a circuit includes first and second phase windings, a direct current (DC) power supply to convert alternating current (AC) power to DC power, at least one power switch between the first and second phase windings, and a controller to control the at least one power switch. The circuit also includes a component to prevent the DC power supply from collapsing when the at least one power switch is on during a first portion of a cycle and a second component to prevent the DC power supply from collapsing when the at least one power switch is on during a second portion of the cycle.

In another aspect, a circuit for a motor includes first and second phase windings, a direct current (DC) power supply to receive alternating current (AC) power transferred from the first and second phase windings and convert the AC power to DC power, at least one power switch between the first and second phase windings to receive AC power from the first and second phase windings, and a controller to control the at least one power switch. The circuit also includes a first component connected to the DC power supply to prevent the DC power supply from collapsing when the at least one power switch is on during a first portion of an AC cycle and a second component connected to the DC power supply to prevent the DC power supply from collapsing when the at least one power switch is on during a second portion of the AC cycle.

In another aspect, a system for a motor includes first and second phase windings to receive alternating current (AC) power, a direct current (DC) power supply connected between the first and second phase windings to receive AC power transferred from the first and second phase windings and convert the AC power to DC power, at least one power switch between the first and second phase windings and outside of a current path between the first and second phase windings and the DC power supply, and a controller to control the at least one power switch. The circuit also includes a plurality of components in parallel with the DC power supply to prevent the DC power supply from collapsing when the at least one power switch is on during a first portion of a cycle and a second portion of the cycle.

In another aspect, a method for a circuit of a motor includes providing first and second phase windings, providing a direct current (DC) power supply to receive alternating current (AC) power transferred from the first and second phase windings and convert the AC power to DC power, providing at least one power switch between the first and second phase windings to receive AC power from the first and second phase windings, and providing a controller to control the at least one power switch. The method also includes providing a first component connected to the DC power supply to prevent the DC power supply from collapsing when the at least one power switch is on during a first portion of an AC cycle; and providing a component connected to the DC power supply to prevent the DC power supply from collapsing when the at least one power switch is on during a second portion of the AC cycle.

In another aspect, a method for a circuit of a motor includes providing first and second phase windings, the first and second phase windings receiving alternating current (AC) power, providing a direct current (DC) power supply connected between the first and second phase windings to receive AC power transferred from the first and second phase windings and to convert the AC power to a DC power, providing at least one power switch between the first and second phase windings, and providing a controller to control the at least one power switch. The method also includes providing a plurality of components in parallel with the DC power supply to prevent the DC power supply from collapsing when the at least one power switch is on during a first portion of a cycle and a second portion of the cycle.

The phase windings may be divided in half or in other portions or otherwise distributed and may be, for example, bifilar or lap wound. The non-collapsing DC power supply components may include one or more of a tap from the phase windings electrically connected to the DC power supply, a secondary phase coil winding connected to the DC power supply to power the power supply, one or more resistors between the phase windings and the power switch circuit, one or more Zener diodes between the phase windings and the power switch circuit, and/or one or more electrical components to create a voltage drop between the phase windings and the power switch circuit to prevent the power supply from collapsing when the at least one power switch in the power switch circuit is on and conducting.

In another aspect, a method is for a circuit for a motor comprising first and second phase windings. The method comprises receiving alternating current (AC) power from the first and second phase windings at a direct current (DC) power supply and converting the AC power to DC power and receiving AC power from the first and second phase windings by at least one power switch between the first and second phase windings and switching the AC power by the at least one power switch. The method further comprises preventing the DC power supply from collapsing, by a first component connected to the DC power supply, when the at least one power switch is on during a first portion of an AC cycle and preventing the DC power supply from collapsing, by a second component connected to the DC power supply, when the at least one power switch is on during a second portion of the AC cycle.

In another aspect, a method is for a circuit for a motor comprising first and second phase windings. The method comprises receiving alternating current (AC) power at first and second phase windings, receiving AC power transferred from the first and second phase windings at a direct current (DC) power supply connected between the first and second phase windings and converting the AC power to a DC power, receiving AC power from the first and second phase windings by at least one power switch between the first and second phase windings and switching the AC power by the at least one power switch, and controlling the at least one power switch with a controller. The method further includes preventing the DC power supply from collapsing by a plurality of components in parallel with the DC power supply when the at least one power switch is on during a first portion of a cycle and a second portion of the cycle.

BRIEF DESCRIPTION OF THE DRAWINGS

FIG. 1 depicts motor phase windings divided with a control circuit located at a mid-point in the motor phase windings.

FIG. 2 depicts a single phase electronically commutated motor (ECM).

FIG. 3 depicts a divided phase winding circuit.

FIG. 4 depicts a divided phase winding circuit with a tap from the divided phase winding coil to the direct current (DC) power supply.

FIG. 5 depicts a divided phase winding circuit with resisters between the divided phase windings and the power switch(es).

FIG. 6 depicts a divided phase winding circuit with a secondary coil.

DETAILED DESCRIPTION

Figure 7:
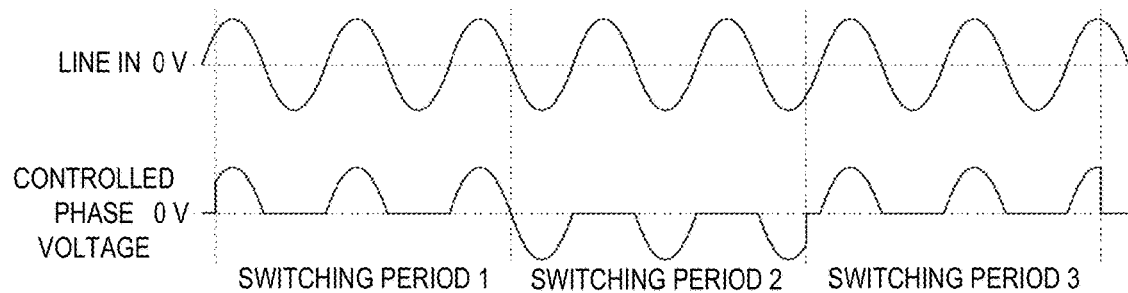
FIG. 7 depicts a control of phase current direction during start up and continuous operation below synchronous speeds in a divided phase winding circuit.
Figure 7:
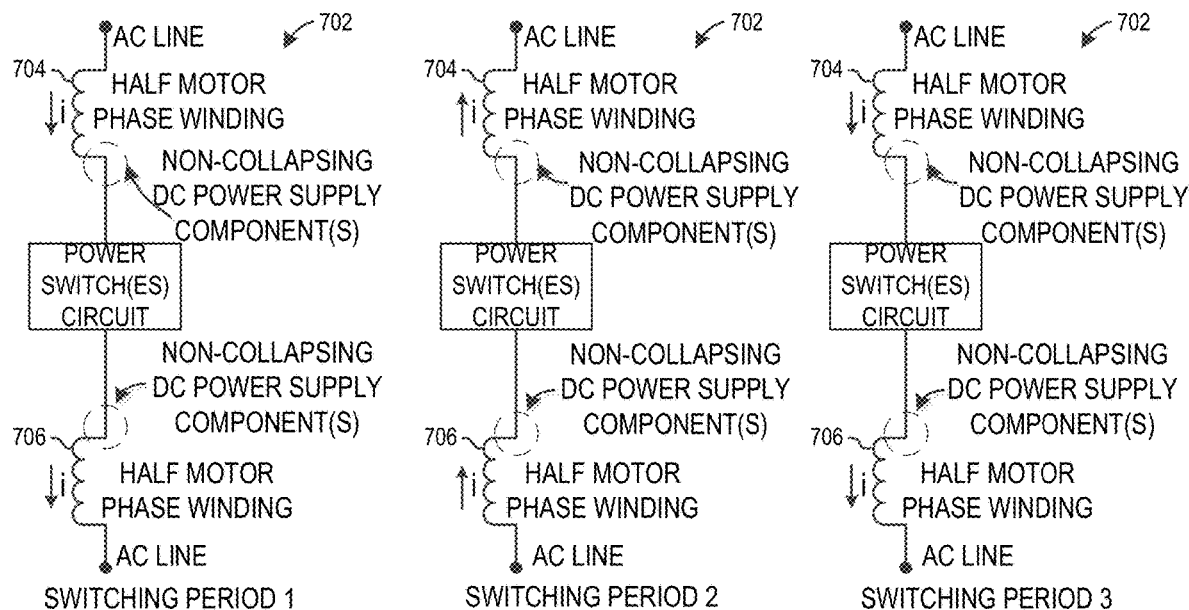

New and useful circuits are disclosed that provide advantages over the prior art for controlling synchronous brushless permanent magnet motors. One embodiment of the present disclosure includes one or more circuits for an electronically commutated motor (ECM). Another embodiment of the present disclosure includes one or more circuits for a shaded pole motor. In one aspect, a motor has multiple motor phases (i.e. motor phase windings) and a supply line voltage through the phases. The motor phases are divided in half and both the motor controller for the motor and the power electronics for the motor are placed at a "mid-point" or "center point" in the supply line voltage between the divided phases. The direct current (DC) power supply (e.g. for the electronics used in the motor controller) are also located between the divided phases. The motor phases provide current limiting and the voltage drop from the line voltage supply lines to low voltage DC to the DC power supply, thereby reducing the DC power supply component count and allowing for the use of low voltage components for the DC power supply and for the motor controller.

Prior systems used a Zener diode or other voltage regulator located in series with a power switch and the motor phases, which limited the maximum power of the motor to the maximum wattage value of the Zener diode. Circuits in the present disclosure eliminate the Zener diode voltage regulator from the primary current path for the motor phases so that a Zener diode voltage regulator is not located in series with a power switch and the motor phases, which eliminates the need to lower the wattage specification otherwise needed for a Zener diode. Instead, the Zener diode or other voltage regulator is located in parallel with the power switch(es) in some embodiments of the present disclosure.

Circuits in the present disclosure eliminate the need for an opto-isolator to allow switching between sensing/control electronics of a motor controller and a power switch of the motor controller. Prior systems had two neutral reference values, one for sensing/control electronics and one for a power switch.

Circuits in the present disclosure have improved line phase angle detection, eliminating the need for a precision resistance bridge linked to the input of an opto-isolator. Thus, the circuits of this aspect have more accurate line phase angle detection.

Circuits in the present disclosure reduce different electrical neutral values for the power switches and motor controller to one value. This guarantees that the power switch(s) of the circuits with this aspect will reliably transition from completely "off" to fully saturated.

Prior systems that included two switches have a difficult time turning one switch off completely for one half of an AC cycle. Circuits in the present disclosure place one or more switches outside of a DC power supply and motor controller circuit, resulting in proper switching.

Each of these improvements not only increases the reliability of the operation of the motor controller, but also serves to improve the combined motor/motor controller efficiency.

The divided phase winding circuits in the present disclosure can be used in a variety of motors, such as DC brushless motors/electronically communicated motors (ECMs), shaded pole motors, other synchronous motors, permanent-split capacitor (PSC) motors, etc.

For example, FIG. 1 depicts a motor 102 with divided motor phase windings 104, 106 and a motor control circuit 108 located at a mid-point 110 in the divided motor phase windings. The motor 102 includes a stator 112 and a rotor 114 mounted on a shaft 116. The rotor 114 is mounted for rotation in a core structure, such as laminated core structure or other core structure. The rotor 114 has a body portion which is shown as cylindrical in shape. Around the periphery of the body are located arcuately shaped permanent magnetic portions. The magnetic portion has its north magnetic pole adjacent to the outer surface of the rotor and the magnetic portion has its south magnetic pole located adjacent to outer periphery of the rotor 114. A winding or pair of windings are mounted on the connecting portion of the core structure. The motor 102 also includes a Hall Effect switching device, a portion of which extends to adjacent the periphery of the rotor 114 for responding to the magnetic polarity of the respective rotor magnetic portions. In the construction as shown, the Hall Effect switch is located adjacent the outer periphery of the magnetic portion during half of each revolution of rotor 114 and adjacent the outer periphery of the magnetic portion during the remaining half of each revolution of rotor.

The motor 102 can operate below, at, or above synchronous speeds. This is due to the fact that fractions of half cycles can flow through the phase windings.

The divided phase winding circuit of FIG. 1 includes input connections on leads L1 and L2 connected to a source of alternating current (AC) energy during operation, such as AC line voltage. The leads L1 and L2 are connected across a series circuit that includes divided phase windings 104, 106 shown connected in series across a control circuit 108. For example, the control circuit 108 may include a full wave diode rectifier bridge circuit connected in series to the divided phase windings 104, 106 and a power switch(es) circuit having one or more switches or other power controllable switching devices connected to the output of the full wave diode rectifier bridge circuit.

The divided phase windings 104, 106 can be bifilar or lap wound. The alternating current power source has its lead L1 connected to the start side S1 of the first winding 104. The other end of the winding 104, labeled F1, is connected to one of the inputs of the control circuit 108. The other input side of the control circuit 108 is attached to the start side S2 of the second divided phase winding 106 and the finish side of the same divided phase winding, labeled F2, is attached to the input lead L2 of the AC power source.

As another example, FIG. 2 depicts a single phase ECM 202 in which the motor phase windings are divided and a motor controller (motor control circuit) is located at a mid-point in the divided motor phase windings.

FIG. 3 discloses a divided phase winding circuit 302 for dividing motor phase windings 304, 306 (also referred to as motor phases or phase coils herein) of a motor in half and placing both a motor controller 308 for the motor and power electronics for the motor, including the DC power supply 310 and a power switch(es) circuit 312 with one or more power switches, at a "mid-point" or "center point" 314 in the supply line voltage between the divided phases 304, 306. In the example of FIG. 3, the motor phase winding is divided in half. Some variation from the half division is allowable, such as between zero and plus/minus 20% of the halfway point.

The divided phase winding circuit 302 of FIG. 3 includes two divided phase windings 304, 306, each connected to AC line voltage L1 and L2 respectively. A DC power supply 310 is electrically connected to the divided phase windings 304, 306, such as at the finish side of the first phase winding 304 and the start side of the second phase winding 306. The divided phase winding 304, 306 operates to lower the AC line voltage to a voltage compatible with the DC power supply 310. Thus, the number of windings in the divided phase winding 304, 306 can be selected to reduce the AC line voltage received at L1 and L2 to a selected lower voltage to be received by the DC power supply 310. The divided phase winding 304, 306 also operates to filter noise from the AC line voltage received at L1 and L2.

The DC power supply 310 converts the low voltage AC power received from the divided phase windings 304, 306 to a DC voltage configured to power the DC powered components of the divided phase winding circuit, including the motor controller 308. The DC power supply 310 then supplies power to the motor controller 308.

The motor controller 308 controls the start-up and operation of the divided phase winding circuit 302. For example, the motor controller 308 controls start-up, including where the motor is a synchronous motor. The motor controller 308 determines the location of the rotor relative to the stator. The motor controller 308 also determines and monitors the speed of the rotor, such as in revolutions per minute (RPMs), to determine operational parameters of the motor, such as when the motor has reached synchronous speed, and controls the motor based on the location of the rotor and or speed of the motor. In one example, the motor controller 308 has a Hall effect switch and/or other rotation determining device to determine the position of the rotor and/or rotation counting or speed determining device to determine the speed of the rotor.

The power switch(es) circuit 312 includes one or more power switches, such as one or more metal-oxide-semiconductor field-effect transistors (MOSFETs), silicon-controlled rectifiers (SCRs), transistors, or other switches or switching devices. The one or more switches are on or off or one is on while the other is off. For example, in one half cycle of an AC cycle, a first power switch is on and conducting while the second switch is off and not conducting. In the other half cycle of the AC cycle, the second power switch is on and conducting while the first switch is off and not conducting. In circuits with one switch, the switch may be on and conducting or off and not conducting during one or more portions of the AC cycle.

The power switch(es) circuit 312 is isolated from (outside of) the DC power supply 310, which makes the divided phase winding circuit 302 more stable than circuits having the power switch(es) circuit within (and not isolated from) the DC power supply.

Normally, when the power switch(es) of a circuit turn on, there is only a slight voltage drop through the power switch(es) due to the minor resistance of the power switch(es). Therefore, if the input voltage for the DC power supply is developed by connecting the DC power supply leads to both sides of a power switch (or power switches), this would result in the DC power supply collapsing when the power switch is in an 'on' state or not being able to receive power and power the DC components of the circuit. The divided phase winding circuit 302 includes one or more non-collapsing DC power supply components 316, 318, including voltage drop components or direct DC power supply powering components to create a non-collapsing DC power supply. Examples of non-collapsing DC power supply components 316, 318 include a tap from the primary phase winding 304, 306 electrically connected to the DC power supply 310, a secondary phase coil winding connected to the DC power supply to power the power supply, resistors between the divided phase windings and the power switch(es) circuit 312, one or more Zener diodes between the divided phase windings and the power switch(es) circuit, or other components to create a voltage drop between the primary divided phase windings and the power switch(es) circuit to prevent the power supply from collapsing when the power switch(es) in the power switch(es) circuit is/are on and conducting. The divided phase winding circuit 302 therefore provides a constant flow of power regardless of whether the power switch(es) circuit is on and conducting or off and not conducting.

Many electronically controlled synchronous motors have circuits that detect the zero crossing of the AC voltage applied to the phase windings. This zero crossing detection circuit sends a signal to the motor controller 308 to determine when the motor is at synchronous speed. If the AC supply voltage has electrical noise riding on, usually due to other equipment operating on the same circuit, this electrical noise can cause the zero crossing detector to operate incorrectly affecting the control of the motor which normally appears as acoustical noise in the motor.

In one example, the divided phase winding circuit 302 is part of a synchronous motor. The synchronous motor receives line power (that is, AC power) at L1 and L2. In a synchronous motor using a divided phase winding using the associated circuit of the present disclosure does not rely upon detecting the zero crossing of the applied AC voltage to control the motor but rather detects the polarity of the voltage, i.e. whether the polarity L2 is higher or less than L1 allowing for quiet operation even when electrical noise is present in the AC supply.

The DC power supply 310 in FIG. 3 is electrically connected directly to the divided phase windings 304, 306. Thus, the DC power supply 310 is powered by the divided phase windings 304, 306 regardless of the status of the power switch(es) circuit 312.

FIG. 4 discloses another divided phase winding circuit 402 for dividing motor phase windings 404, 406 of a motor in half and placing both a motor controller 408 for the motor and power electronics for the motor, including the DC power supply 410 and a power switch(es) circuit 412 with one or more power switches, at a "mid-point" or "center point" 414 in the supply line voltage between the divided phases. The divided phase winding circuit 402 of FIG. 4 includes a tap 416, 418 from the primary divided phase winding 404, 406 electrically connected to the DC power supply 410 to create a non-collapsing DC power supply.

In some circuits, when the motor reaches synchronous speed, the one or more power switch(es) turn off and thereby cause the low voltage power to stop flowing to the motor controller. In one example, the path from one divided phase winding through the power switch(es) to another divided phase winding is shorted, such as at synchronous speed, resulting the DC power supply and motor controller no longer receiving the low power supply voltage from the phase windings, such as in the event there is no capacitor to hold a charge during the short or a capacitor that is present is not large enough to hold enough charge during the short. The circuit 402 of FIG. 4 includes a tap 416, 418 from the coils of the phase windings 404, 406 to the DC power supply 410 so that the low voltage power supply flows directly from the phase windings to the DC power supply, bypassing the power switch(es) ("divided motor phase controller"). The circuit 402 of FIG. 4 thereby guarantees that the low voltage power supply is supplied to the DC power supply 410, for example at synchronous speed.

In one example, a DC power supply 410 for a divided motor phase controller is formed by a Zener diode and a storage capacitor that receives power during a portion of an alternating current (AC) cycle when the power switch(es) are off. When the motor is operating at synchronous speed, the power switch(es) are continuously conducting. Therefore, the amount of voltage being supplied to the DC power supply is equal to the voltage drop across the switch(es), which can result in a low voltage when using low on resistance (RDS(on)) power MOSFETs.

FIG. 5 discloses another divided phase winding circuit 502 for dividing motor phase windings 504, 506 of a motor in half and placing both a motor controller 508 for the motor and power electronics for the motor, including the DC power supply 510 and a power switch(es) circuit 512 with one or more power switches, at a "mid-point" or "center point" 514 in the supply line voltage between the divided phases. The circuit 502 of FIG. 5 includes resistors R1 and R2 between the motor phase windings 504, 506 and the power switch(es) circuit 512 to hold up and therefore maintain the low voltage power supply supplied from the phase windings to the DC power supply 510 and create a non-collapsing DC power supply. The circuit of FIG. 5 thereby maintains the low voltage power supply to the DC power supply 510, for example at synchronous speed.

FIG. 6 discloses another divided phase winding circuit 602 for dividing motor phase windings 604, 606 of a motor in half and placing both a motor controller 608 for the motor and power electronics for the motor, including the DC power supply 610 and a power switch(es) circuit 612 with one or more power switches, at a "mid-point" or "center point" 614 in the supply line voltage between the divided phases. The primary divided phase winding 604, 606 limits the current that can flow to the DC power supply 610 eliminating the need for current limiting components that waste power. The divided phase winding circuit 602 of FIG. 6 includes a secondary phase winding 616, 618 electrically connected to the DC power supply 610 to create a non-collapsing DC power supply.

In one example, the power switch(es) circuit 612 includes a Zener diode or other voltage regulator and a power switch in parallel. Whereas, prior systems included the power circuit in series with other components. Because the power switch is in parallel with the Zener diode and not in series, it can always be on. However, if the power switch is off, current can still flow through the Zener diode.

The circuit of FIG. 6 includes one or more secondary coils (also referred to as a secondary winding) 616, 618 that provide a low voltage power supply to the DC power supply 610, such as when the motor is at start-up. The one or more secondary coils 616, 618 also act as a high frequency noise filter to filter out high frequency noise from the low power voltage supplied to the DC power supply 610.

The secondary winding 616, 618 may be distributed anywhere, such as evenly between the first and second divided phase windings 604, 606, all on one pole, or unevenly between the first and second divided phase windings, such as a greater number of turns or coils on one secondary winding than another secondary winding.

In the example of FIG. 6, the divided phase winding circuit 602 can turn off the DC electronics, including the motor controller 608, when the motor is on and at synchronous speed. Thus, the motor controller 608 of the divided phase winding circuit 602 determines the speed of the motor and whether the motor is or is not at synchronous speed. For example, 1800 RPM may be the synchronous speed for a motor with four stator poles (two north stator poles and two south stator poles). Every half AC cycle, power is supplied to one of the magnetic poles. Therefore, it takes two cycles to provide power to the four magnetic poles. Thus, the synchronous speed is 1800 RPM if the motor is synced to line AC. Similarly, the synchronous speed for an eight-pole stator would be 900 RPMs.

FIG. 7 depicts a control of phase current direction during start up and continuous operation below synchronous speeds in a divided phase winding circuit 702.

As shown in FIG. 7, the current will always flow across both divided phase windings 704, 706 and control circuit in the same direction. The divided phase windings 704, 706, being in series with the control circuit, represent one winding with the control circuit placed at the mid-point or center point between the divided phase windings. The current and voltage applied to the divided phase windings will always be in the same direction through both coils, and the magnetic polarity of the divided phase windings will likewise be the same.

As discussed below, the control circuit may include a diode rectifier bridge circuit whose output is connected to one or more power switches. As shown in FIG. 7, if the output terminals of the diode bridge rectifier of the control circuit are shorted when the voltage on lead L1 is positive, the current will only flow through the winding 704, 706 in one direction, but in half cycle increments. If the voltage across leads L1 and L2 is 60 cycles, then the outputs of the diode bridge rectifier circuit in the control circuit will be shorted only when lead L1 is positive, and current flow will flow only in one direction and for 8 milliseconds. No current will flow for 8 milliseconds on the alternate half cycles. Then current would flow for another 8 milliseconds and so on. If the output of the diode bridge circuit of the control circuit is shorted when lead L2 is positive, then power will flow in exactly the same manner. If the shorting of the output of the bridge is accomplished selectively, that is based on the angular position of the magnetic rotor, continuous motor action will be produced. If the diode bridge rectifier circuit output in the control circuit is shorted for a fraction of a half cycle selectively based on the angular position of the magnetic rotor as described above, and only when lead L1 is positive, then any desired speed can be accomplished including speeds higher than the synchronous speed. The characteristics of such a motor would be similar to a DC motor with pulsating current applied to the inputs. However, rather than having multiple power switching components achieve the switching of the divided phase windings, the divided phase winding circuit makes use of the fact that alternating current in conjunction with one power switching component can accomplish the switching.

Figure 8:
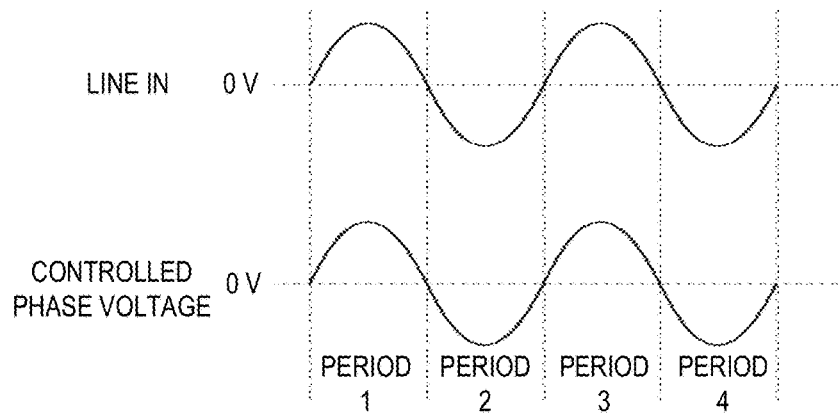
FIG. 8 depicts a control of phase current direction at a synchronous speed of 1800 revolutions per minute (RPM) in a four pole divided phase winding circuit.

FIG. 8 depicts an example of control of phase current direction at a synchronous speed of 1800 revolutions per minute (RPM) in a four pole divided phase winding circuit. At synchronous speed, the controlled phase is synchronized with the AC line input.

Figure 9:
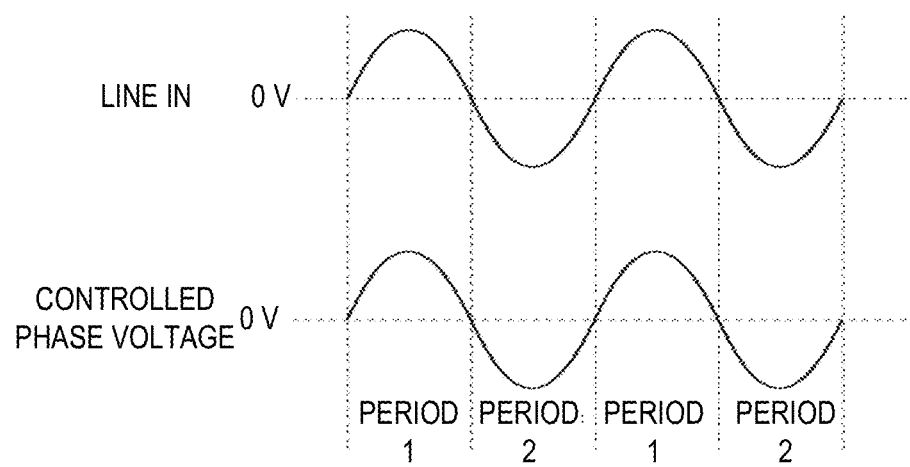
FIG. 9 depicts a control of phase current direction at a synchronous speed of 3600 revolutions per minute (RPM) in a two pole divided phase winding circuit.

FIG. 9 depicts a control of phase current direction at a synchronous speed of 3600 revolutions per minute (RPM) in a two pole divided phase winding circuit. At synchronous speed, the controlled phase is synchronized with the AC line input.

Figure 10:
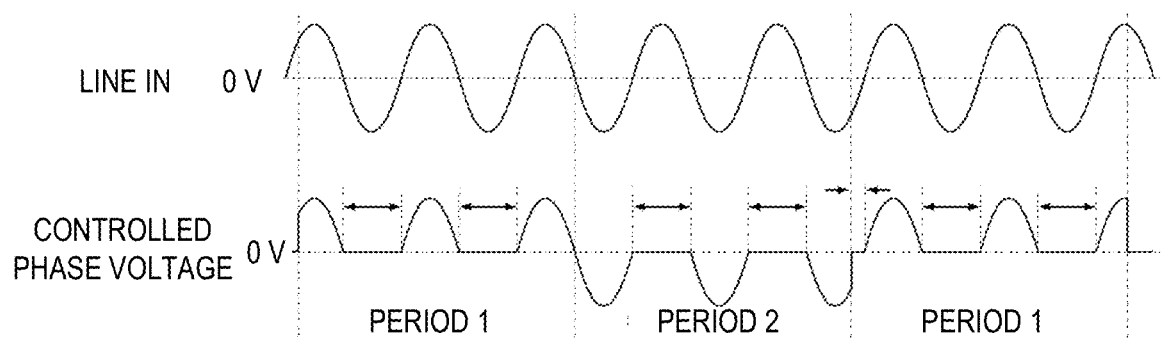
FIG. 10 depicts DC supply storage capacitor charging periods.

FIG. 10 depicts an example of DC power supply storage capacitor charging periods in a divided phase winding circuit. Note the correlation to the wave form of FIG. 7.

Figure 11:
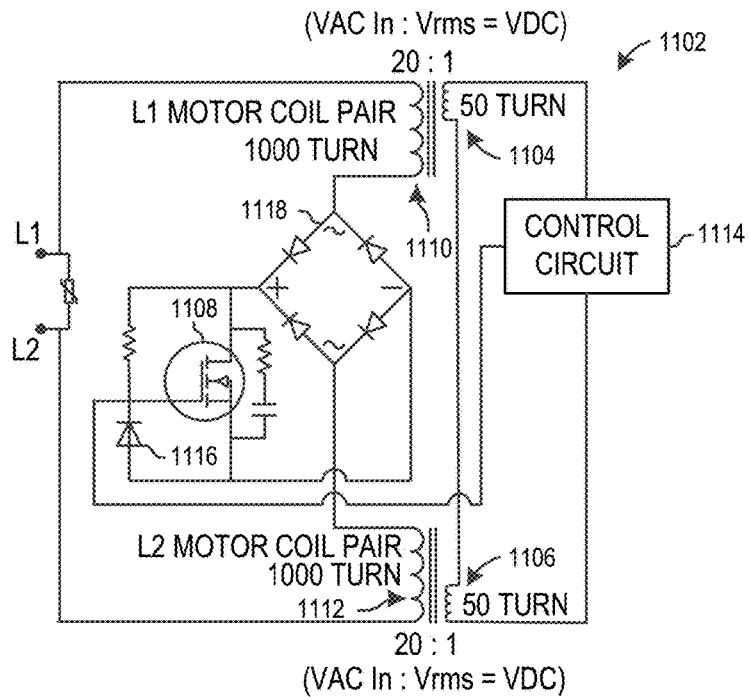
FIG. 11 depicts a divided phase winding circuit with a secondary coil and one power switch.

FIG. 11 depicts a divided phase winding circuit 1102 with a secondary coil 1104, 1106 and one power switch 1108. The primary divided phase winding 1110, 1112 limits the current that can flow to the DC power supply.

The control circuit 1114 controls switching for the power switch(es) circuit based on timing of the input frequency and rotor position. The control circuit 1114 controls the start-up and operation of the divided phase winding circuit. For example, the control circuit 1114 controls start-up, including where the motor is a synchronous motor. The control circuit 1114 determines the location of the rotor relative to the stator. The control circuit 1114 also determines and monitors the speed of the rotor, such as in revolutions per minute (RPMs), to determine operational parameters of the motor, such as when the motor has reached synchronous speed, and controls the motor based on the location of the rotor and or speed of the motor. In one example, the control circuit 1114 has a Hall effect switch and/or other rotation determining device to determine the position of the rotor and/or rotation counting or speed determining device to determine the speed of the rotor.

In one example, the power switch(es) circuit includes a Zener diode 1116 or other voltage regulator and a power switch 1108 in parallel. Whereas, prior systems included the power circuit in series with other components. Because the power switch 1108 is in parallel with the Zener diode 1116 and not in series, it can always be on. However, if the power switch is off, current can still flow through the Zener diode.

The circuit of FIG. 11 includes one or more secondary coils (also referred to as a secondary winding) 1104, 1106 that provide a low voltage power supply to the DC power supply, such as when the motor is at start-up. The one or more secondary coils 1104, 1106 also act as a high frequency noise filter to filter out high frequency noise from the low power voltage supplied to the DC power supply.

The secondary winding 1104, 1106 may be distributed anywhere, such as evenly between the first and second divided phase windings 1110, 1112, all on one pole, or unevenly between the first and second divided phase windings, such as a greater number of turns or coils on one secondary winding than another secondary winding.

The way that the coils are connected to the circuit via the diode bridge rectifier 1118 allow for current to flow through the coils in only one direction at any given time. The improvements that have been made to this motor and controller greatly improve the DC logic power supply which enables a more reliable logic control circuit. Secondary coils 1104, 1106 are wound with the motor coils in a method that creates a transformer using the motor coils as primary 1110, 1112.

The improvements that have been made to this motor and controller greatly improve the DC logic power supply which enables a more reliable logic control circuit. Secondary coils are wound with the motor coils in a method that creates a transformer using the motor coils as primary. The example of FIG. 11 uses a 20:1 ratio. The example of FIG. 11 includes 1000 turns per motor primary coil and 50 turns per secondary coil that are wound on the same stator pole. However, other turn ratios may be used, higher or lower. The ratio between the primary motor coils 1110, 1112 and secondary coils 1104, 1106 may change with AC input power and/or DC power requirements. This circuit not only isolates all DC circuitry from high voltages from the line, but also creates a non-collapsible DC power supply to the control circuit when power is applied to inputs L1 and L2.

The power switch(es) circuit consists of 2 main components, a full wave bridge rectifier 1118 and a MOSFET power switch 1108. The full wave bridge rectifier 1118 guarantees that no negative voltage will be supplied to the drain (top) of the power switch 1108. The full wave bridge rectifier 1118 also guarantees that no positive voltage will be supplied to the source (bottom) of the power switch 1108 so that current can only flow from the drain to the source of the power switch 1108 when biased by a positive voltage on the gate of the power switch 1108 via resistor R1. Simultaneously, as a positive rectified AC power supply is present at the drain of the power switch 1108, the power switch 1108 is biased by the same voltage signal via resistor R1. Diode 1116 protects the gate of the power switch 1108 by guaranteeing that any voltage on the gate of the power switch 1108 will be greater than −0.7 VDC, as anything less could damage or destroy the power switch 1108. Resistor R11 and capacitor C5 are used as a "snubber" to filter out transients or high frequency noise. R11 and C5 provide added protection for the MOSFET power switch 1108, especially in noisy environments.

Figure 12:
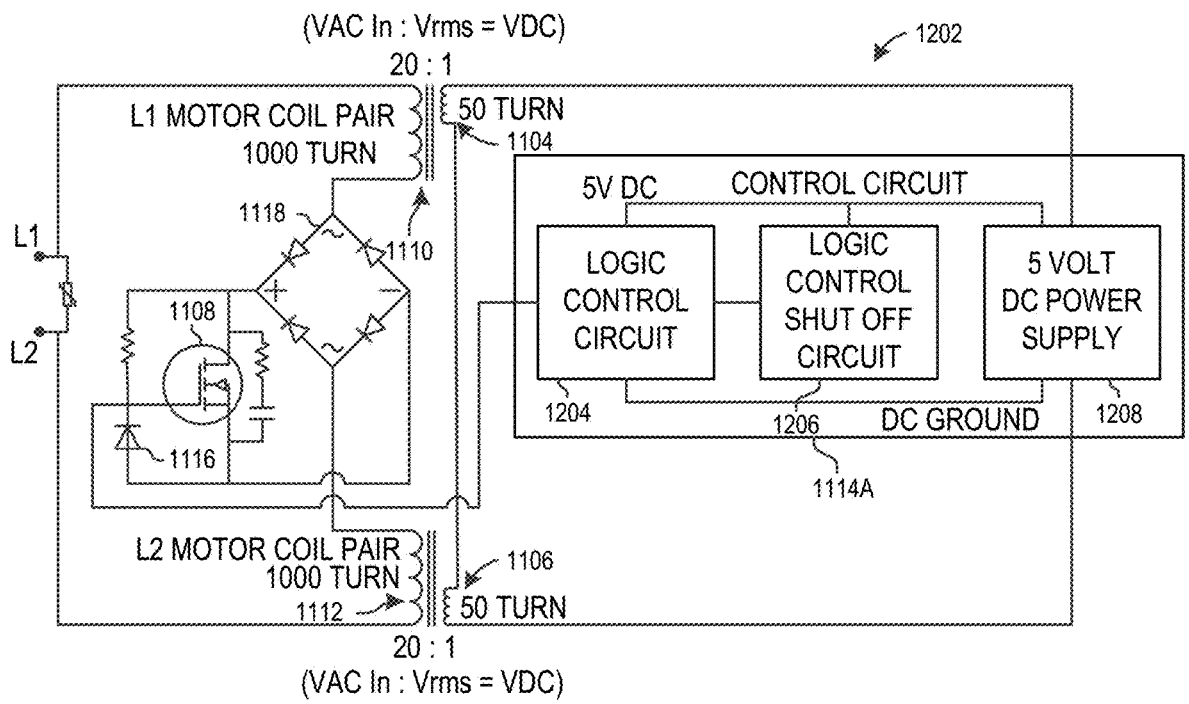
FIG. 12 depicts a divided phase winding circuit with a secondary coil and one power switch.

FIG. 12 depicts a divided phase winding circuit 1202 with a secondary coil 1104, 1106 and one power switch 1108. The circuit of FIG. 12 includes the same power switch(es) circuit of FIG. 11 and the same secondary coils 1104, 1106. In addition, the control circuit 1114A of FIG. 12 includes a logic control circuit 1204 to control operation of the motor, including through synchronous speed, a logic control shut off circuit 1206 to control when the power switch(es) circuit is turned off, and a non-collapsing DC power supply 1208 to supply DC power to the logic control circuit and login control shut off circuit. The logic control circuit 1204 and logic control shut off circuit 1206 may be configured as a single logic control circuit.

In one embodiment, one purpose of this divided phase windings circuit 1202 is to allow a motor to run synchronously to the AC power supply line frequency (for example, for a 4 pole motor, 60 Hz=1800 rpm and 50 Hz=1500 rpm). Without any control circuitry, the power switch(es) circuit would allow current to flow as if coil pairs L1 and L2 were shorted together through the power switch(es) circuit. The control circuitry simply turns power switch(es) circuit off until the rotor is in the proper position compared to the line voltage. For this reason, in one aspect, the power switch(es) circuit is rated for the AC power supply line voltage. The control circuitry components can all be at the logic level voltage (VCC). Logic power is supplied by secondary coils 1104, 1106 that are wound on the same poles as the primary motor coils 1110, 1112. Secondary coils 1104, 1106 could be wound on any number of poles as long as the secondary power meets logic power requirements. Since the control circuit is only needed to start the motor and bring it to synchronous speed, the logic control shut off circuit optionally is included to shut off the main control circuit. The logic control shut off circuit is optional. By shutting the control circuit off, the power switch(es) circuit will allow full line power to the motor minus any losses in the power switch(es) circuit. This will increase total efficiency and the life of components especially when the motor runs for long periods.

Figure 13:
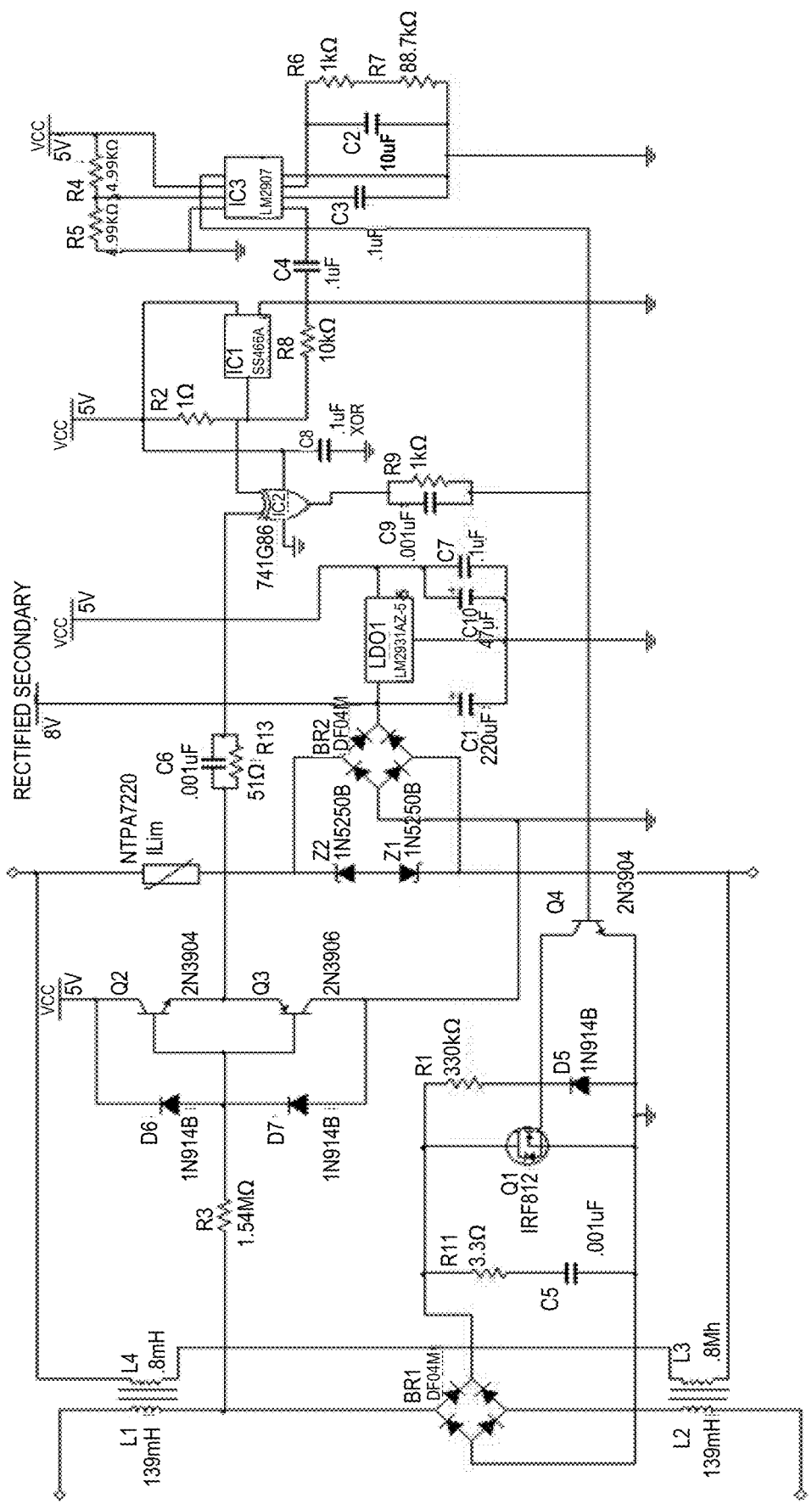
FIGS. 13 and 13A depict a divided phase winding circuit with a secondary coil and one power switch.
Figure 13A:
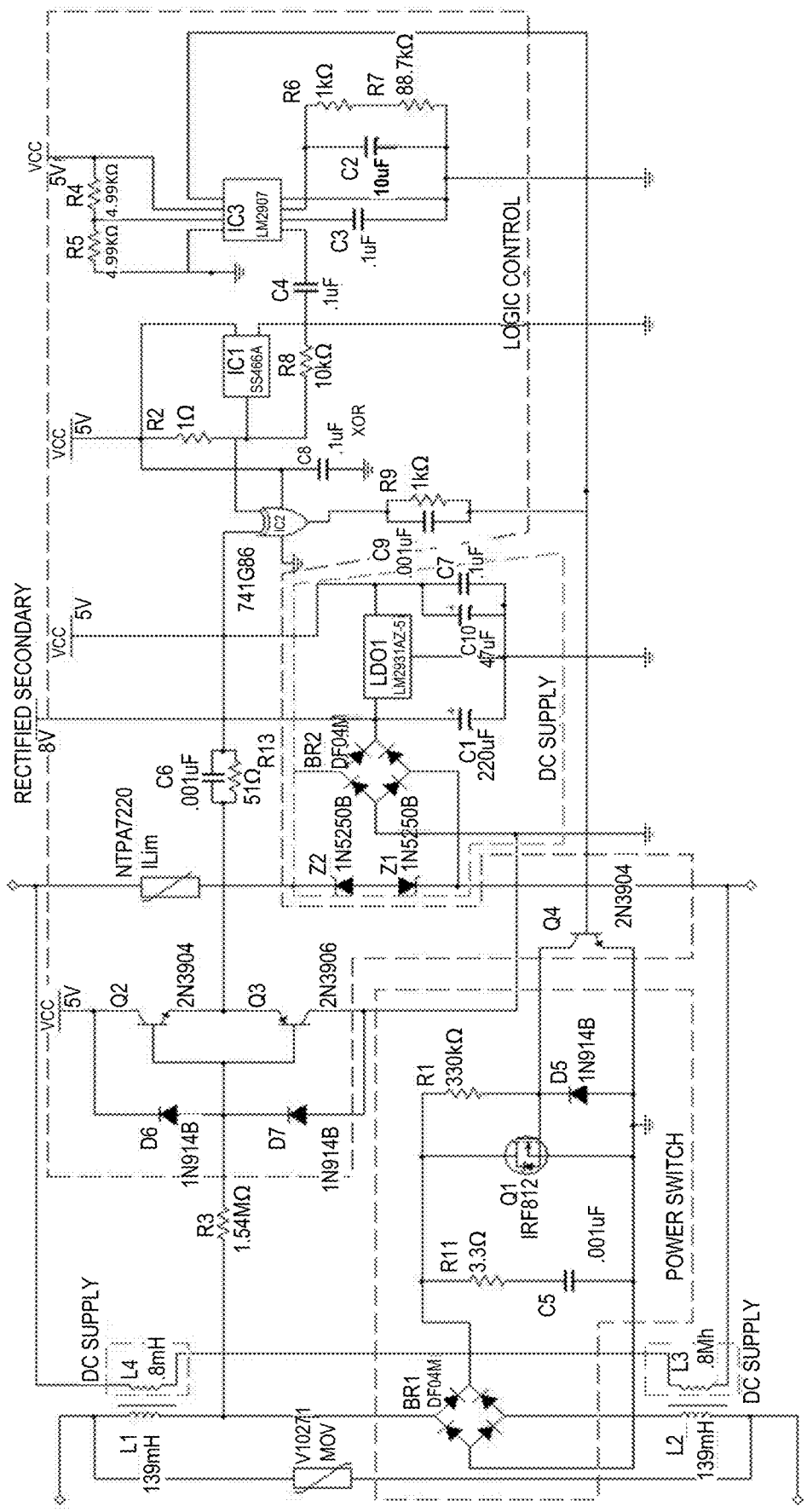

FIGS. 13 and 13A depict a divided phase winding circuit with a secondary coil and one power switch. The circuit has two AC supply line inputs L1 and L2, which are connected to an AC power source during operation of the motor.

Power Switch

The Power Switch block consists of 2 main components, a full wave bridge rectifier BR1 and a MOSFET power switch Q1. The full wave bridge rectifier BR1 guarantees that no negative voltage will be supplied to the drain (top) of the power switch Q1. The full wave bridge rectifier BR1 also guarantees that no positive voltage will be supplied to the source (bottom) of the power switch Q1 so that current can only flow from the drain to the source of the power switch Q1 when biased by a positive voltage on the gate of the power switch Q1 via resistor R1. Simultaneously, as a positive rectified AC power supply is present at the drain of the power switch Q1, the power switch Q1 is biased by the same voltage signal via resistor R1. Diode D5 protects the gate of the power switch Q1 by guaranteeing that any voltage on the gate of the power switch Q1 will be greater than −0.7 VDC, as anything less could damage or destroy the power switch Q1. Resistor R11 and capacitor C5 are used as a "snubber" to filter out transients or high frequency noise. R11 and C5 provide added protection for the MOSFET power switch Q1, especially in noisy environments.

DC Power Supply

As soon as power is applied to the motor and current is flowing through the motor phase windings (motor primary coils), there is power on the secondary windings (secondary coils) in the same manner as the operation of a transformer. The value of voltage on the secondary coils is directly proportional to the input voltage and the primary to secondary turn count ratio. Using the example in FIG. 11, if the input voltage to the primary coils is 120 VAC and the turn count ratio from primary to secondary is 20:1, then the voltage on the secondary coils would calculate to approximately 6 VAC minus any losses. Power from the secondary coils is supplied directly from the secondary coils to the DC power supply. The full wave bridge rectifier BR2 rectifies the low voltage AC power supply from the secondary coils. The full wave bridge rectifier BR2 can be a low power component based on the DC supply requirements.

Zener diodes Z1 and Z2 are connected in series with each other anode to anode, and each cathode is connected to the AC power supply inputs of the full wave bridge rectifier BR2. This method is used to protect the full wave bridge rectifier BR2 from AC power supply inputs that could exceed maximum ratings for the component. The negative output from the full wave bridge rectifier BR2 is connected to the circuit ground, which is also connected to the same ground as the power switch block. The positive output from the full wave bridge rectifier BR2 is connected to the low drop-out regulator LDO1 and capacitor C1. Capacitor C1 is provided to smooth the rectified AC power supply signal going to the input of the low drop-out regulator LDO1. A bypass capacitor C7 could be used on the output of the low drop-out regulator LDO1 to help reduce noise on the positive DC rail (VCC). Also, a larger capacitor C10 could be used on the output of the low drop-out regulator LDO1 to smooth the positive DC rail and ensure power during some low voltage situations. C7 and C10 are not required but are provided to add reliability and protection for low voltage DC components, especially in a noisy environment.

Logic Control

The control circuit controls switching for the power switch(es) circuit based on timing of the AC supply line input frequency and rotor position. Timing of the AC supply line input frequency is sensed using an AC buffer that consists of bi-polar junction transistors (BJTs) Q2 and Q3 and diodes D6 and D7. Current to the AC buffer input is limited by a high value resistor R3. Diode D6 ensures that the AC buffer input is not greater than the positive DC supply voltage. Diode D7 ensures the AC buffer input is greater than −0.7 volts referenced to the DC supply ground.

When the input to the AC buffer is logic high, BJT Q2 is biased, and the output of the AC buffer is also logic high. When the input to the AC buffer is logic low, BJT Q3 is biased, and the output of the AC buffer is logic low. The output the AC buffer is connected to a filter consisting of capacitor C6 and resistor R13. The filter is not required but provides protection and reliability in noisy environments.

Rotor magnet polarity is sensed using Hall-effect switch IC1. Though, another switch or sensing device may be used to sense rotor magnet polarity and/or rotor position and/or determine speed and/or determine rotor revolutions. The Hall-effect switch IC1 is an open-collector output and therefore requires a pull-up to the positive DC rail (VCC). Resistor R2 provides the pull-up required for the open-collector output.

The output of the Hall-effect switch IC1 and the output of the AC buffer are compared using a single circuit logic XOR IC2. The output of the XOR IC2 is the difference between the Hall-effect switch IC1 and the AC buffer, which will bias MOSFET power switch Q1 of the power switch(es) circuit. When the Hall-effect switch IC1 output is logic low, the power switch Q1 will only be biased when the AC supply input L1 to the motor is negative. When the output of the Hall-effect switch IC1 is logic high, the power switch Q1 will only be biased when the AC supply input L1 to the motor is positive. During motor start up, there can be multiple input AC cycles where either only the positive or only the negative inputs from AC supply input L1 will pass through the power switch Q1.

Using the power switch Q1, waveforms can be "chopped" or shut off at any time when the drain and gate voltage of the power switch Q1 is above biasing voltage. For example, see FIG. 7. The gate of the power switch Q1 is held logic low when the output of the XOR IC2 is logic high by biasing BJT Q4. When BJT Q4 is biased, any current flowing from resistor R1 will bypass the gate of the power switch Q1 and flow through BJT Q4 from collector to emitter electrically connecting the gate of the power switch Q1 to its source and will shut off the power switch Q1 immediately.

When the frequency of the Hall-effect switch IC1 matches the frequency of the input AC supply, the motor is running synchronously. If the motor is running synchronously, the control circuit is not needed until either the motor falls out of sync or the motor is stopped and restarted. When the frequency to voltage regulator IC3 senses synchronous speed or greater from the Hall-effect switch IC1, the output of the XOR IC2 is held logic low via the open-collector output of the voltage regulator IC3. If the sensor speed is less than that of the input AC supply, the open-collector output of the voltage regulator IC3 is off, which will leave the output of the XOR IC2 unaffected.

This method ensures that when the motor is running at a synchronous speed, the power switch Q1 is not shut off by the logic control. But, if the motor slows down below synchronous speeds, then the logic controller will control the motor timing as it does for start-up. Using this method improves overall motor efficiency and the expected lifetime of components in the circuit.

External components are required to set timing for the voltage regulator IC3. Resistors R4, R5, R6 and R7 may be 1% tolerance so that the voltage regulator IC3 operates within accurate parameters. Capacitor C1 operates in conjunction with the resistors R6 and R7 to set the frequency at which the open-collector output of the voltage regulator IC3 will turn on. Capacitor C3 is used for an internal charge pump in the voltage regulator IC3. Capacitor C4 is used to AC couple the input to the voltage regulator IC3 since the voltage regulator IC3 will only detect frequencies that have a zero-voltage crossing. Resistor R8 limits current to the AC couple C4 at the input of the voltage regulator IC3.

Figure 14:
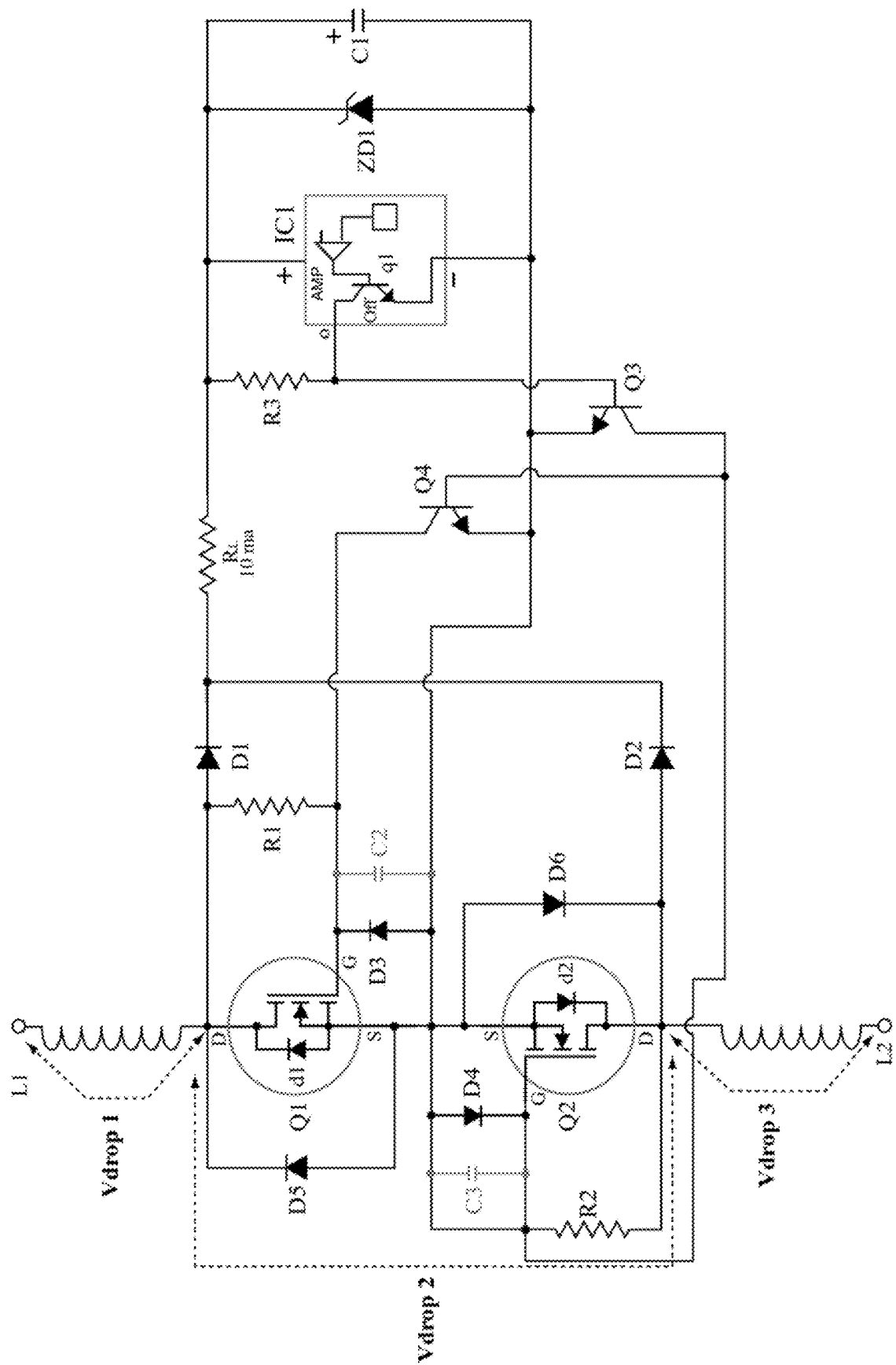
FIG. 14 depicts a divided phase winding circuit with two power switches.

FIG. 14 depicts a divided phase winding circuit with two power switches.

Figure 15:
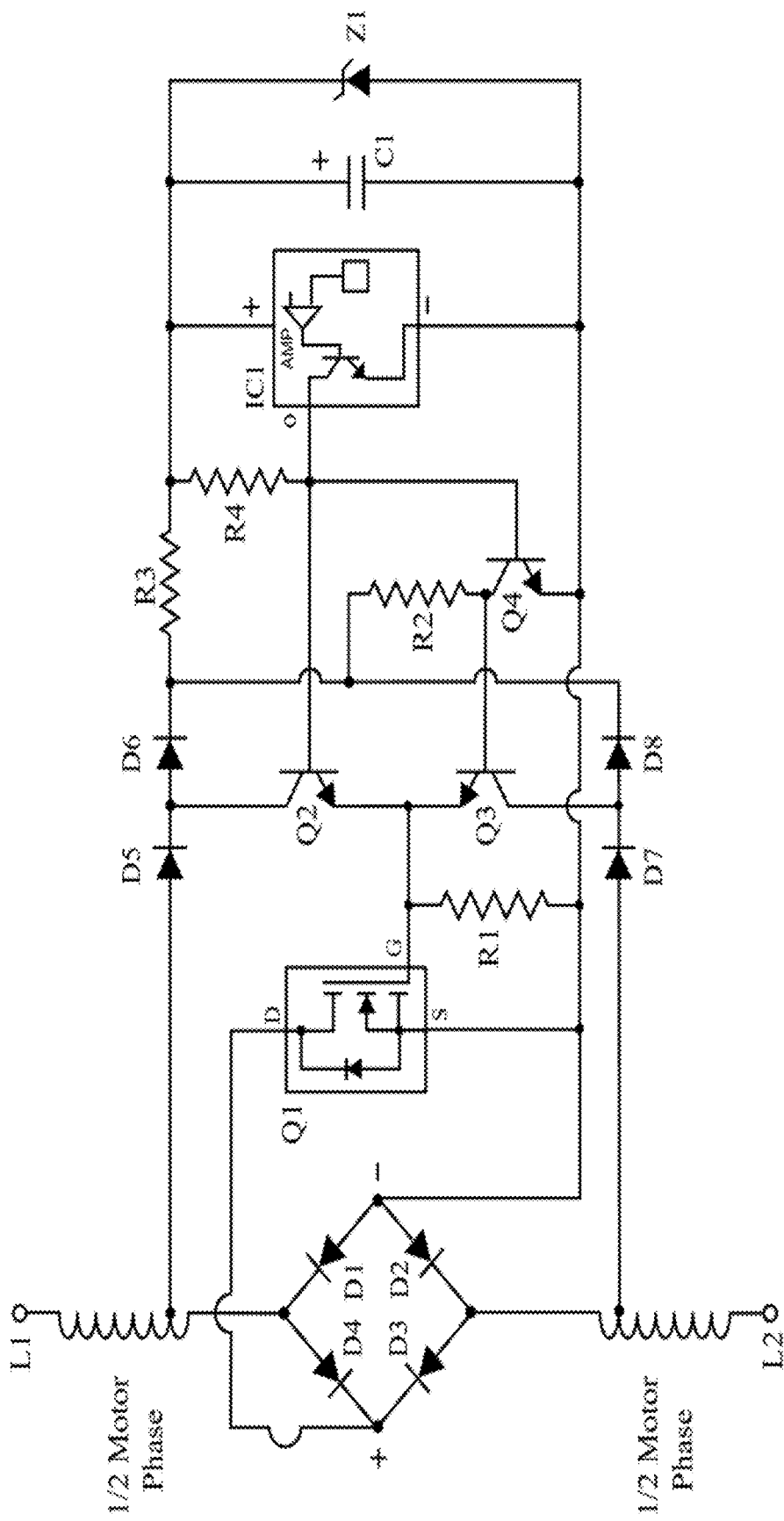
FIG. 15 depicts a divided phase winding circuit with one power switch.

FIG. 15 depicts a divided phase winding circuit with one power switch.

Figure 16:
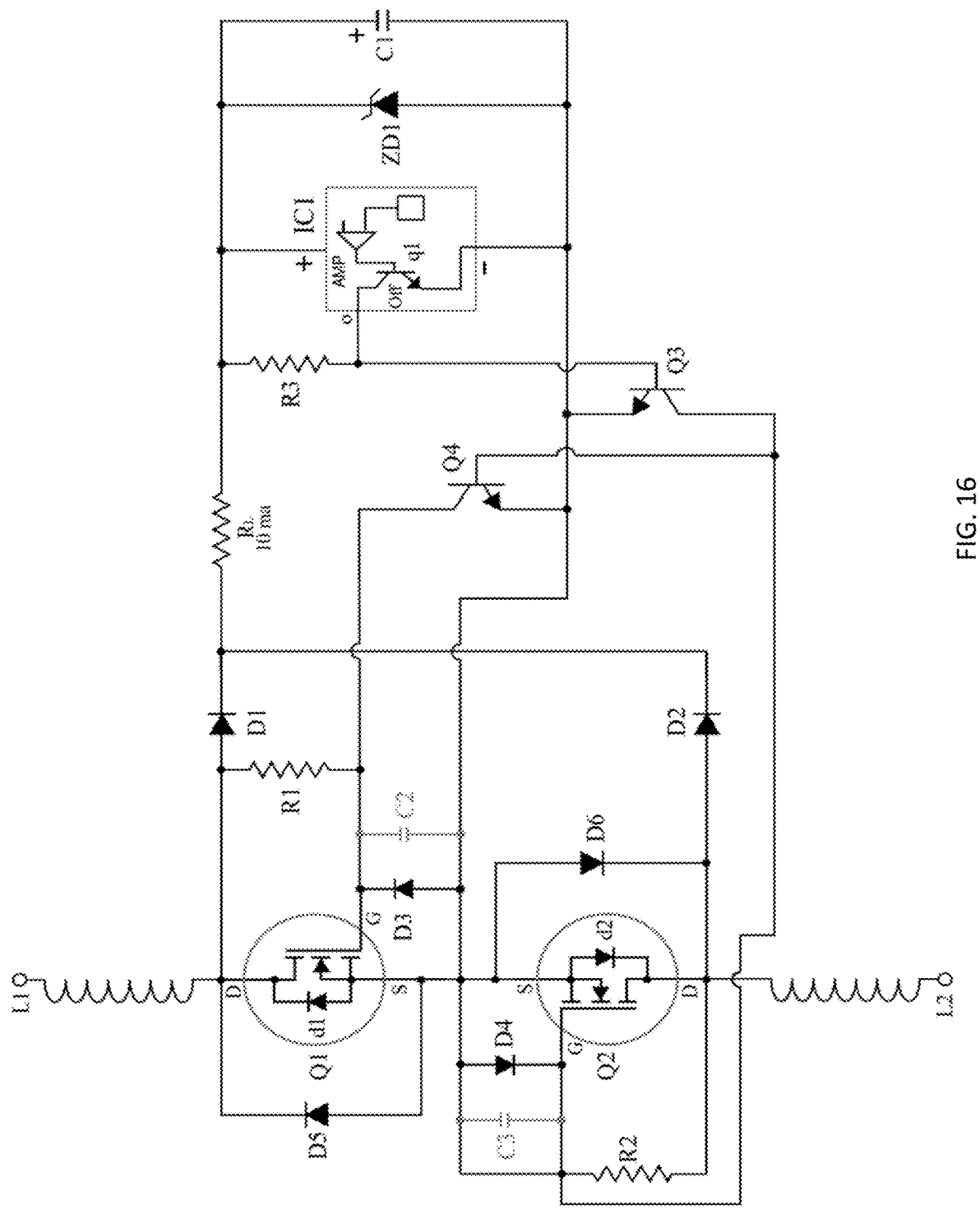
FIG. 16 depicts a divided phase winding circuit with two power switches in series.

FIG. 16 depicts a divided phase winding circuit with two power switches in series. Diodes D1 & D2 are 1N4003 and diodes D3 & D4 are 1N914. Transistors Q3 and Q4 are 2N3904. IC1 is a Hall-effect switch/sensor. Diodes D5 and D6 are used to increase the current capacity for the internal diodes in switches Q1 and Q2 (d1 & d2) if the phase current exceeds the internal diodes forward current rating. Capacitors C2 and C3 are optional in one embodiment. Capacitors C2 and C3 are used to create a 'turn on' delay for switches Q1 and Q2 to add additional charge time for capacitor C1 if necessary to insure a solid 3.3 VDC or 5 VDC supply for Hall switch/sensor IC1, depending upon the device choice for Hall switch/sensor IC1. In prior systems, 5 VDC was necessary to switch on the logic level power MOSFET switch.

Diodes D1, D2, d1, and d2 perform the rectification of the AC power for the DC power supply for Hall switch/sensor IC1.

Zener diode ZD1 provides the voltage regulator for the Hall switch/sensor IC1's DC supply.

RL provides current limiting for the DC power supply. It should be set to approximately limit the current to 10 mA. The Hall switch/sensor IC1 uses 6 mA, including the base drive current for the internal open collector output transistor. Additional DC current will be used to switch Q3 and is supplied through the 'pull up' resistor R3. The collector to emitter current for switch Q3 and the base and collector to emitter current for switch Q4 is not supplied by the DC power supply but is supplied by the current through the motor phase windings. It is preferable to assure that transistors Q3 and Q4 turn completely 'off' at the proper times. It is preferred in one embodiment, but not a requirement, that the switches turn fully 'on' or in saturation at the proper times for maximum operational efficiency.

Figure 17:
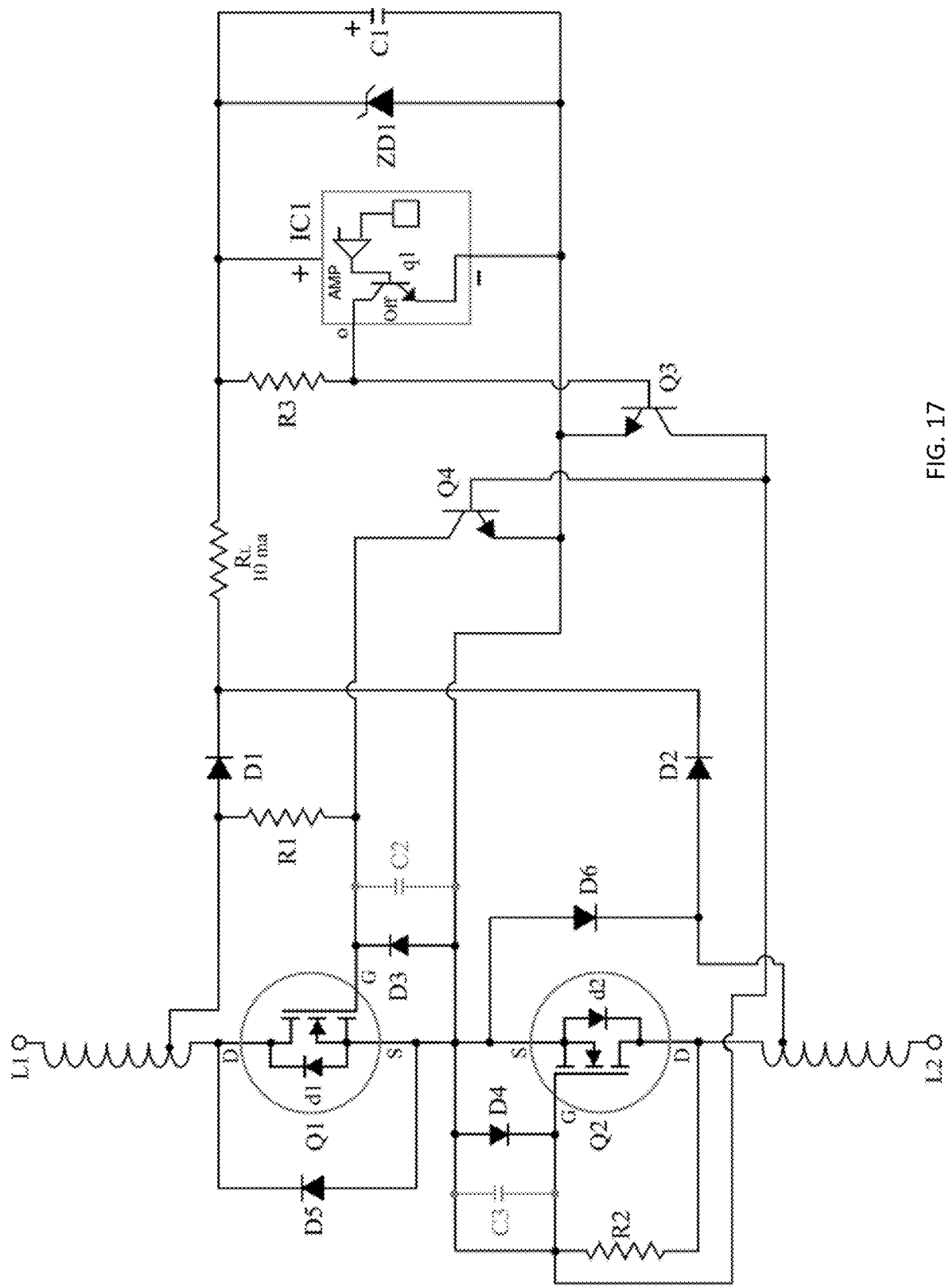
FIG. 17 depicts a divided phase winding circuit with a tap from the divided phase winding coil to the direct current (DC) power supply and two power switches in series.

FIG. 17 depicts a divided phase winding circuit with a tap from the divided phase winding coil to the direct current (DC) power supply and two power switches in series.

Figure 18:
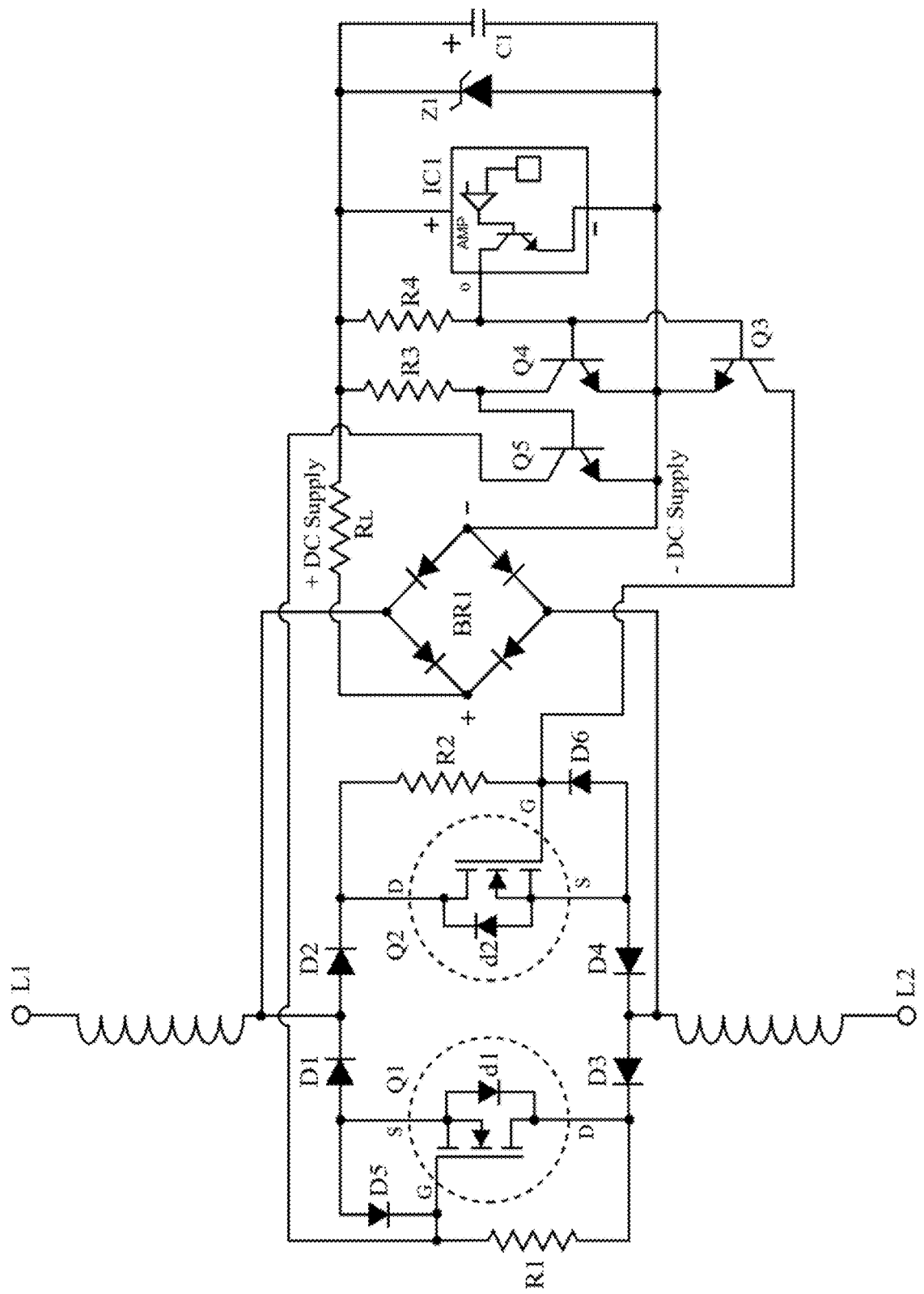
FIG. 18 depicts a divided phase winding circuit with two power switches in parallel.

FIG. 18 depicts a divided phase winding circuit with two power switches in parallel.

Figure 19:
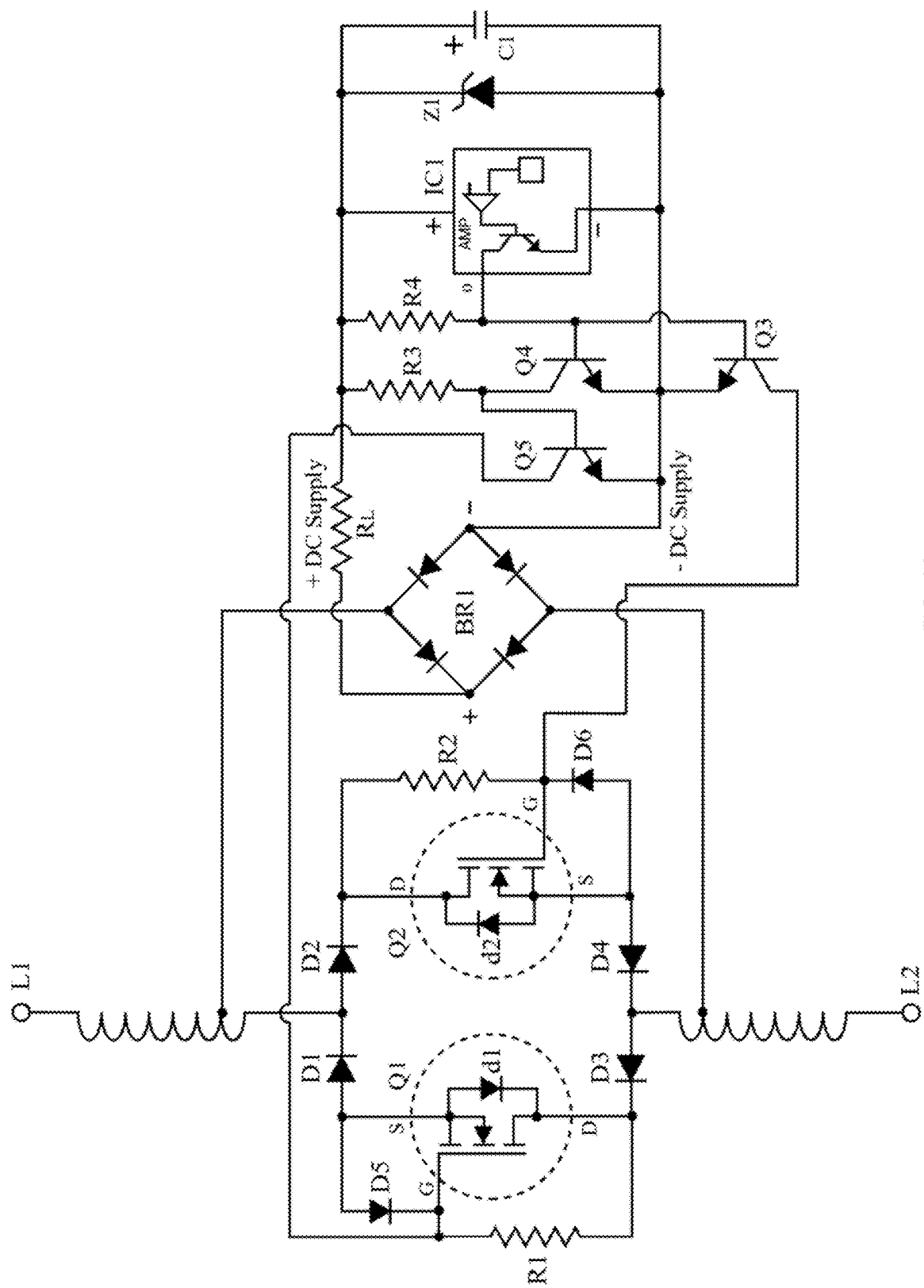
FIG. 19 depicts a divided phase winding circuit with a tap from the divided phase winding coil to the direct current (DC) power supply and two power switches in parallel.

FIG. 19 depicts a divided phase winding circuit with a tap from the divided phase winding coil to the direct current (DC) power supply and two power switches in parallel.

Figure 20:
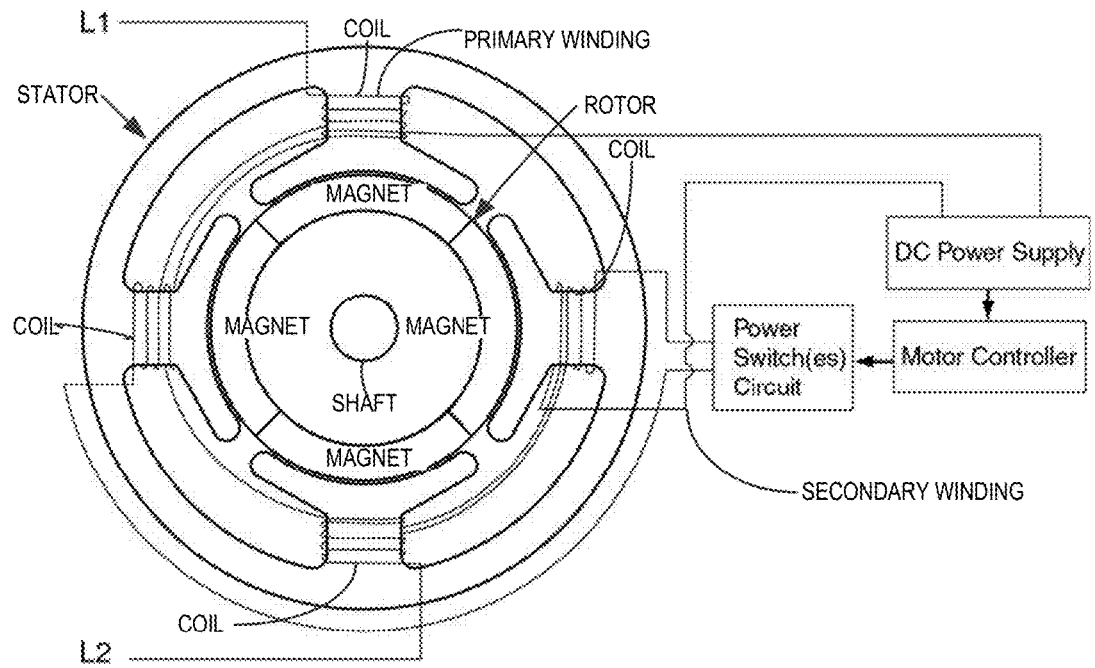
FIG. 20 depicts a motor with a divided phase winding circuit having a primary AC phase winding and secondary winding to create a non-collapsing DC power supply.

FIG. 20 depicts a motor with a divided phase winding circuit having a primary AC phase winding and secondary winding to create a non-collapsing DC power supply. In the motor of FIG. 20, the secondary winding is wound on all poles. However, the secondary winding can be wound on just one pole, two poles, three poles, or another number of poles. The secondary winding is connected in series with the primary phase winding in the motor of FIG. 20. However, the secondary winding also may be connected in parallel or with a combination of both series and parallel. The motor of FIG. 20 is a four pole permanent magnet synchronous motor. The synchronous speed for the motor when operating at 60 Hz AC is 1800 RPM.

Figure 21:
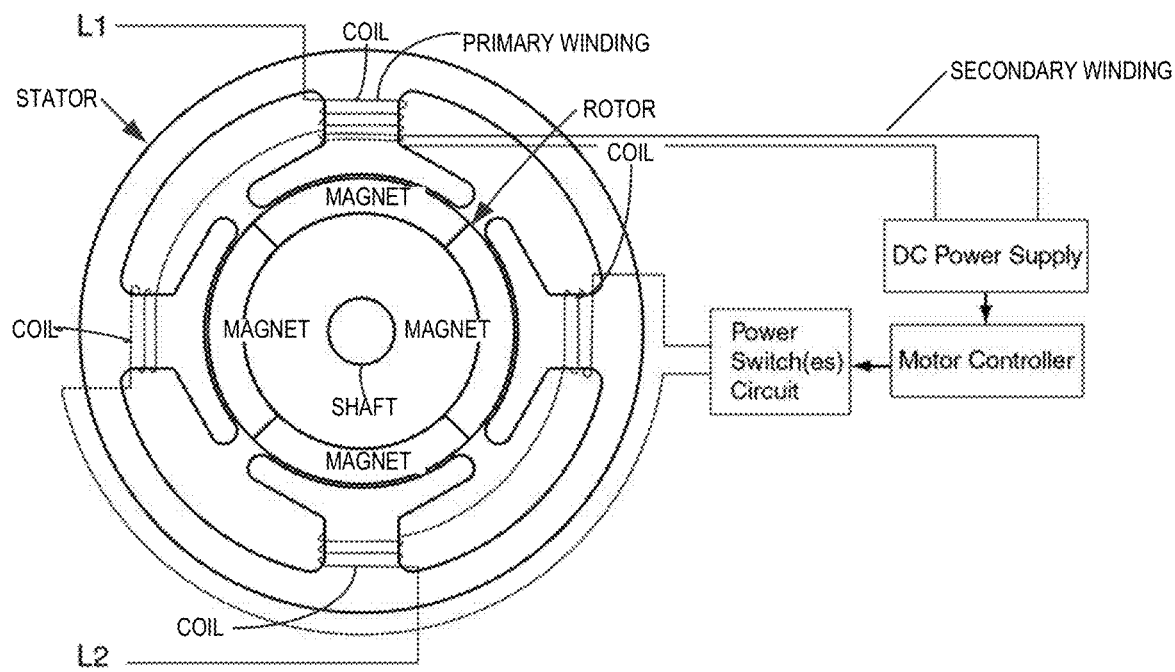
FIG. 21 depicts a motor with a divided phase winding circuit having a primary AC phase winding and secondary winding to create a non-collapsing DC power supply wound on only one pole.

FIG. 21 depicts a motor with a divided phase winding circuit having a primary AC phase winding and secondary winding to create a non-collapsing DC power supply wound on only one pole. The motor of FIG. 21 is a four pole permanent magnet synchronous motor. The synchronous speed for the motor when operating at 60 Hz AC is 1800 RPM.

Figure 22:
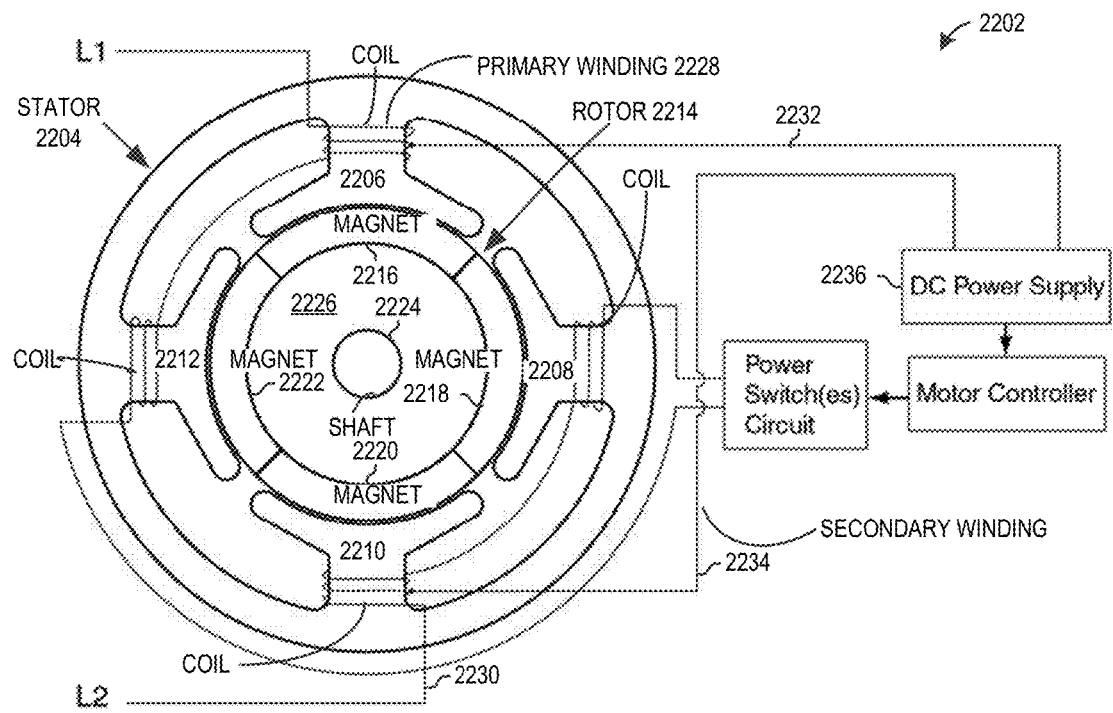
FIG. 22 depicts a motor with a divided phase winding circuit with a tapped primary phase winding to create a non-collapsing DC power supply.

FIG. 22 depicts a motor 2202 with a divided phase winding circuit with a tapped primary phase winding to create a non-collapsing DC power supply. The motor of FIG. 22 is a four pole permanent magnet synchronous motor. The synchronous speed for the motor when operating at 60 Hz AC is 1800 RPM.

The motor has a stator 2204 with 4 poles 2206-2212 and a rotor 2214 with 4 magnets N, S, N, S 2216-2222 facing the stator. The motor 2202 has a shaft (center circle) 2224 and rotor back iron (the area between the shaft and the magnets) 2226. The primary divided phase windings 2228, 2230 are connected to an AC power supply at L1 and L2, respectively. A secondary winding 2232, 2234 is connected to the DC power supply 2236.

Figure 23:
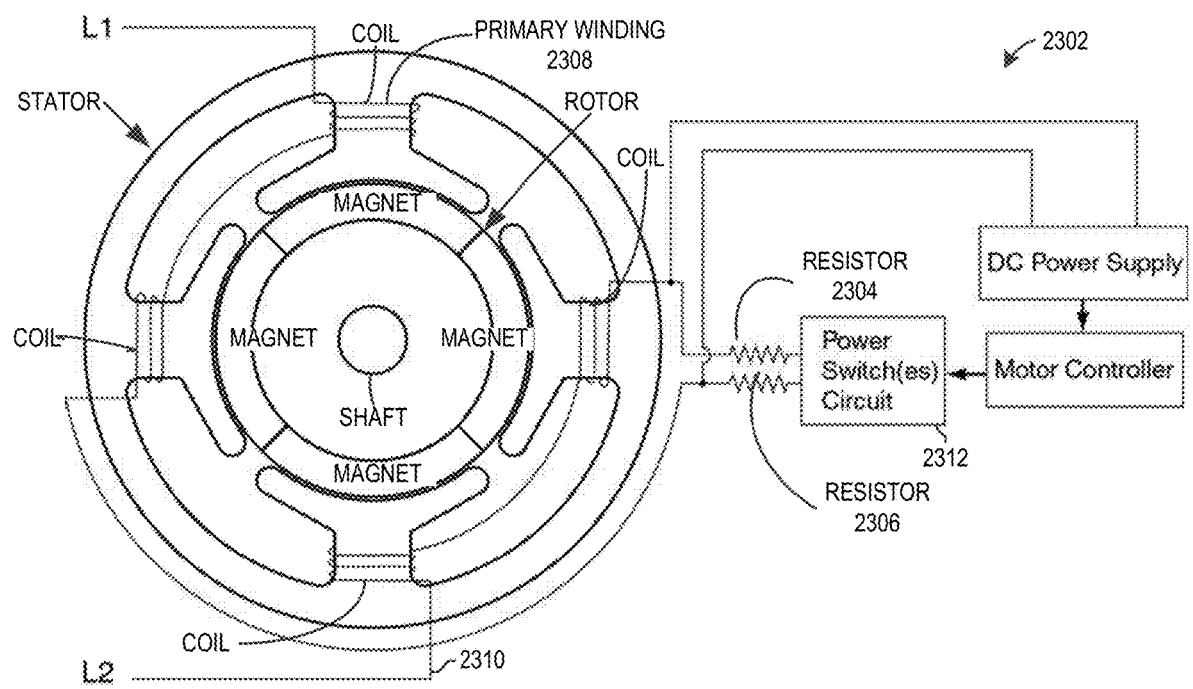
FIG. 23 depicts a motor with a divided phase winding circuit with resisters to create a non-collapsing DC power supply.

FIG. 23 depicts a motor with a divided phase winding circuit 2302 with resisters 2304, 2306 between the divided phase windings 2308, 2310 and the power switch(es) circuit 2312 to create a non-collapsing DC power supply. The motor of FIG. 23 is a four pole permanent magnet synchronous motor. The synchronous speed for the motor when operating at 60 Hz AC is 1800 RPM.

Figure 24:
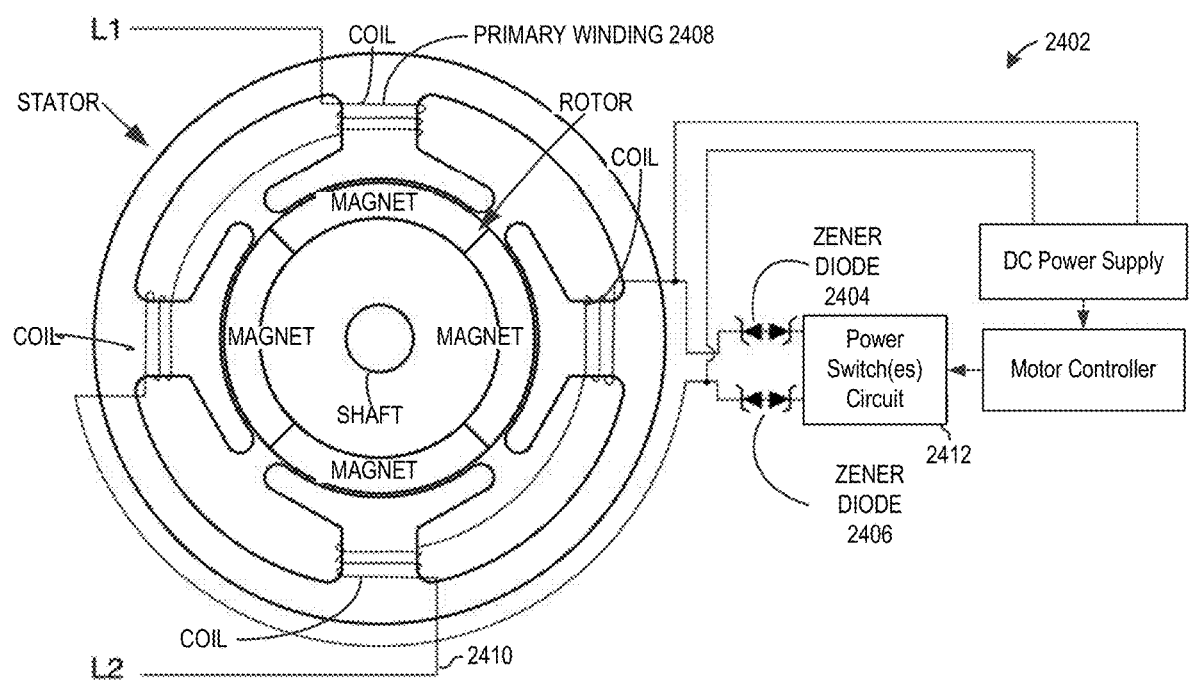
FIG. 24 depicts a motor with a divided phase winding circuit with Zener diodes to create a non-collapsing DC power supply.

FIG. 24 depicts a motor with a divided phase winding circuit 2402 with Zener diodes 2404, 2406 between the divided phase windings 2408, 2410 and the power switch(es) circuit 2412 to create a non-collapsing DC power supply. The motor of FIG. 24 is a four pole permanent magnet synchronous motor. The synchronous speed for the motor when operating at 60 Hz AC is 1800 RPM.

Those skilled in the art will appreciate that variations from the specific embodiments disclosed above are contemplated by the invention. The invention should not be restricted to the above embodiments, but should be measured by the following claims.

What is claimed is:

1. A method for a circuit for a motor comprising first and second phase windings, the method comprising:
   receiving alternating current (AC) power from the first and second phase windings at a direct current (DC) power supply and converting the AC power to DC power;
   receiving AC power from the first and second phase windings by at least one power switch between the first and second phase windings and switching the AC power by the at least one power switch;
   preventing the DC power supply from collapsing, by a first component connected to the DC power supply, when the at least one power switch is on during a first portion of an AC cycle; and
   preventing the DC power supply from collapsing, by a second component connected to the DC power supply, when the at least one power switch is on during a second portion of the AC cycle.

2. The method of claim 1 further comprising using for each of the first and second components at least one of one or more resistors between the first and second phase windings and the at least one power switch and one or more Zener diodes between the first and second phase windings and the at least one power switch.

3. The method of claim 1 further comprising using for each of the first and second components a tap from the first and second phase windings electrically connected to the DC power supply to supply the AC power to the DC power supply and bypass the at least one power switch.

4. The method of claim 1 further comprising using for each of the first and second components a secondary phase coil winding wound in relation to the first and second phase windings and electrically connected to the DC power supply to supply the AC power to the DC power supply and bypass the at least one power switch.

5. The method of claim 4 further comprising distributing the secondary phase coil windings evenly between the first and second phase windings or unevenly between the first and second phase windings.

6. The method of claim 4 further comprising distributing the secondary phase coil windings all on one pole or on more than one pole of a stator of the motor.

7. The method of claim 1 further comprising using for each of the first and second components an electrical component to create a voltage drop between the first and second phase windings and the at least one power switch to prevent the DC power supply from collapsing when the at least one power switch is on.

8. The method of claim 1 further comprising using at least one Zener diode in parallel with the at least one power switch, wherein current flows through the at least one Zener diode when the at least one power switch is on and off.

9. The method of claim 1 further comprising using a voltage regulator in parallel with the at least one power switch.

10. The method of claim 1 further comprising using a full wave bridge rectifier operably connected to the at least one power switch to stop negative voltage from being supplied to a drain of the at least one power switch and to stop positive voltage from being supplied to a source of the at least one power switch so that current only flows from the drain to the source of the at least one power switch when the at least one power switch is biased by a positive voltage on a gate of the at least one power switch.

11. The method of claim 1 wherein the first and second components are between the first and second phase windings.

12. The method of claim 11 wherein the at least one power switch is outside of a current path between the first and second phase windings and the DC power supply.

13. The method of claim 1 wherein the DC power supply is connected to a start side of one of the first and second phase windings and a finish side of another of the first and second phase windings.

14. The method of claim 1 wherein the controller monitors a speed of a rotor of the motor and controls the motor based on the speed of the motor.

15. The method of claim 1 wherein the controller determines when the motor is at synchronous speed and controls the at least one power switch at synchronous speed.

16. The method of claim 1 wherein the DC power supply is operably connected to the first and second phase windings and the controller is operably connected to the DC power supply.

17. The method of claim 1 wherein the motor comprises a rotor and a stator, the first and second phase windings receive AC line voltage, and the controller turns off the at least one power switch when the rotor is in an identified rotor position, rotor magnet polarity, or speed relative to the AC line voltage.

18. The method of claim 1 wherein the motor comprises a rotor and the method further comprises sensing a rotor position with a sensing device, wherein the controller controls the at least one power switch based on the rotor position.

19. The method of claim 1 wherein the motor comprises a rotor and the method further comprises sensing the rotor magnet polarity with a sensing device, wherein the controller controls the at least one power switch based on the rotor magnet polarity.

20. The method of claim 1 further comprising using for the at least one power switch a first power switch and a second power switch, wherein the first power switch is on while the second power switch is off in one half of the AC cycle, and the second power switch is on while the first power switch is off in another half of the AC cycle.

21. The method of claim 1 further comprising using for the at least one power switch at least one of one power switch, two power switches in series, and two power switches in parallel.

22. The method of claim 1 further comprising using for the at least one power switch at least one of one or more metal-oxide-semiconductor field-effect transistors (MOSFETs) and one or more silicon-controlled rectifiers (SCRs).

23. The method of claim 1 further comprising using the motor as at least one of a DC brushless motor, an electronically commutated motor, a shaded pole motor, and a permanent split capacitor motor.

24. The method of claim 1 wherein the motor can operate at synchronous speed, below synchronous speed, and above synchronous speed.

25. The method of claim 1 wherein the first and second phase windings are connected to AC line voltage.

26. The method of claim 1 wherein the first component is connected directly or indirectly to the DC power supply and the second component is connected directly or indirectly to the DC power.

27. A method for a circuit for a motor comprising first and second phase windings, the method comprising:
- receiving alternating current (AC) power at first and second phase windings;
- receiving AC power transferred from the first and second phase windings at a direct current (DC) power supply connected between the first and second phase windings and converting the AC power to a DC power;
- receiving AC power from the first and second phase windings by at least one power switch between the first and second phase windings and switching the AC power by the at least one power switch;
- controlling the at least one power switch with a controller; and
- preventing the DC power supply from collapsing by a plurality of components in parallel with the DC power supply when the at least one power switch is on during a first portion of a cycle and a second portion of the cycle.

28. The method of claim 27 wherein the first component is connected directly or indirectly to the DC power supply and the second component is connected directly or indirectly to the DC power supply.

* * * * *